(12) United States Patent
Fischer

(10) Patent No.: US 12,553,551 B2
(45) Date of Patent: Feb. 17, 2026

(54) SYSTEM AND METHOD FOR JOINING AND HANGING DUCTS

(71) Applicant: Herbert J. Fischer, Imperial, MO (US)

(72) Inventor: Herbert J. Fischer, Imperial, MO (US)

( * ) Notice: Subject to any disclaimer, the term of this patent is extended or adjusted under 35 U.S.C. 154(b) by 736 days.

(21) Appl. No.: 15/800,662

(22) Filed: Nov. 1, 2017

(65) Prior Publication Data

US 2018/0231160 A1 Aug. 16, 2018

Related U.S. Application Data

(63) Continuation of application No. 14/762,697, filed as application No. PCT/US2014/012738 on Jan. 23, 2014, now Pat. No. 10,544,891.

(60) Provisional application No. 61/757,005, filed on Jan. 25, 2013.

(51) Int. Cl.
| | |
|---|---|
| *F16L 23/14* | (2006.01) |
| *F16B 35/04* | (2006.01) |
| *F16L 23/18* | (2006.01) |
| *F16L 25/00* | (2006.01) |
| *F24F 13/02* | (2006.01) |

(52) U.S. Cl.
CPC ............ *F16L 23/14* (2013.01); *F16B 35/048* (2013.01); *F16L 23/18* (2013.01); *F16L 25/0009* (2013.01); *F24F 13/0254* (2013.01)

(58) Field of Classification Search
CPC ......... F16L 23/14; F16L 25/048; F16L 23/18; F16B 35/048; F16B 25/0063; F24F 13/0209; F24F 13/0254
See application file for complete search history.

(56) References Cited

U.S. PATENT DOCUMENTS

| | | | | |
|---|---|---|---|---|
| 2,321,378 A | * | 6/1943 | Green | F16B 25/0068 411/533 |
| 2,321,379 A | | 6/1943 | Green | |
| 3,711,138 A | * | 1/1973 | Davis | F16B 5/02 411/409 |
| 4,218,079 A | * | 8/1980 | Arnoldt | F16L 23/14 285/331 |
| 4,466,641 A | * | 8/1984 | Heilman | F24F 13/0209 285/364 |
| 4,579,375 A | * | 4/1986 | Fischer | F16L 23/14 285/363 |
| 5,069,484 A | * | 12/1991 | McElroy | F24F 13/0209 285/39 |

(Continued)

FOREIGN PATENT DOCUMENTS

| | | | | |
|---|---|---|---|---|
| AT | 368609 B | * | 10/1982 | ............ F16B 27/00 |
| DE | 10047727 A1 | | 4/2002 | |

(Continued)

*Primary Examiner* — Matthew R Mcmahon
(74) *Attorney, Agent, or Firm* — Grogan, Tuccillo & Vanderleeden, LLP

(57) ABSTRACT

A corner flange connection member configured for joining together adjacent duct channel flanges associated with duct sections includes two leg portions joined together in angular relationship by a corner portion, and at least one opening in said corner portion for receiving at least one fastening member for connecting said corner flange connection member to the duct sections. The at least one opening is shaped so as to threadably receive the fastening member without cutting threads.

12 Claims, 41 Drawing Sheets

(56) References Cited

U.S. PATENT DOCUMENTS

| | | | | |
|---|---|---|---|---|
| 5,283,944 A * | 2/1994 | Goodhue | ............. | B21D 53/745 |
| | | | | 29/243.5 |
| 5,564,758 A * | 10/1996 | Tiberio | ................... | F16L 23/14 |
| | | | | 285/405 |
| 5,653,482 A * | 8/1997 | Ficchi, Jr. | ................ | F16L 23/14 |
| | | | | 285/405 |
| 6,412,519 B1 * | 7/2002 | Goodhue | ............. | F16L 23/14 |
| | | | | 138/109 |
| 6,460,573 B1 * | 10/2002 | Fischer | .................. | B23P 19/04 |
| | | | | 138/109 |
| 6,471,256 B1 * | 10/2002 | Fischer | .................. | B23P 19/04 |
| | | | | 285/424 |
| 7,029,037 B2 * | 4/2006 | Poole | .................... | F16L 23/024 |
| | | | | 285/363 |
| 7,163,030 B2 | 1/2007 | Hermanson | | |
| 7,744,134 B2 * | 6/2010 | Dingley | .............. | F24F 13/0209 |
| | | | | 285/405 |
| 8,172,280 B2 | 5/2012 | Fischer | | |
| 8,474,881 B2 | 7/2013 | Fischer | | |
| 9,194,411 B2 | 11/2015 | Carson | | |
| 9,347,476 B2 | 5/2016 | Carson | | |
| 10,240,626 B2 * | 3/2019 | Mair | ..................... | F16B 5/0241 |
| 10,578,333 B2 * | 3/2020 | Yoskowitz | .............. | F16L 23/16 |
| 2002/0124614 A1 | 9/2002 | Hermanson | | |
| 2009/0224538 A1 | 9/2009 | Fischer | | |
| 2012/0248768 A1 | 10/2012 | Fischer | | |
| 2012/0266995 A1 | 10/2012 | Carson | | |

FOREIGN PATENT DOCUMENTS

| | | | | |
|---|---|---|---|---|
| FR | 2491563 A3 * | 4/1982 | ............. | F16B 27/00 |
| FR | 2713291 A1 * | 6/1995 | .......... | F16B 25/0015 |

* cited by examiner

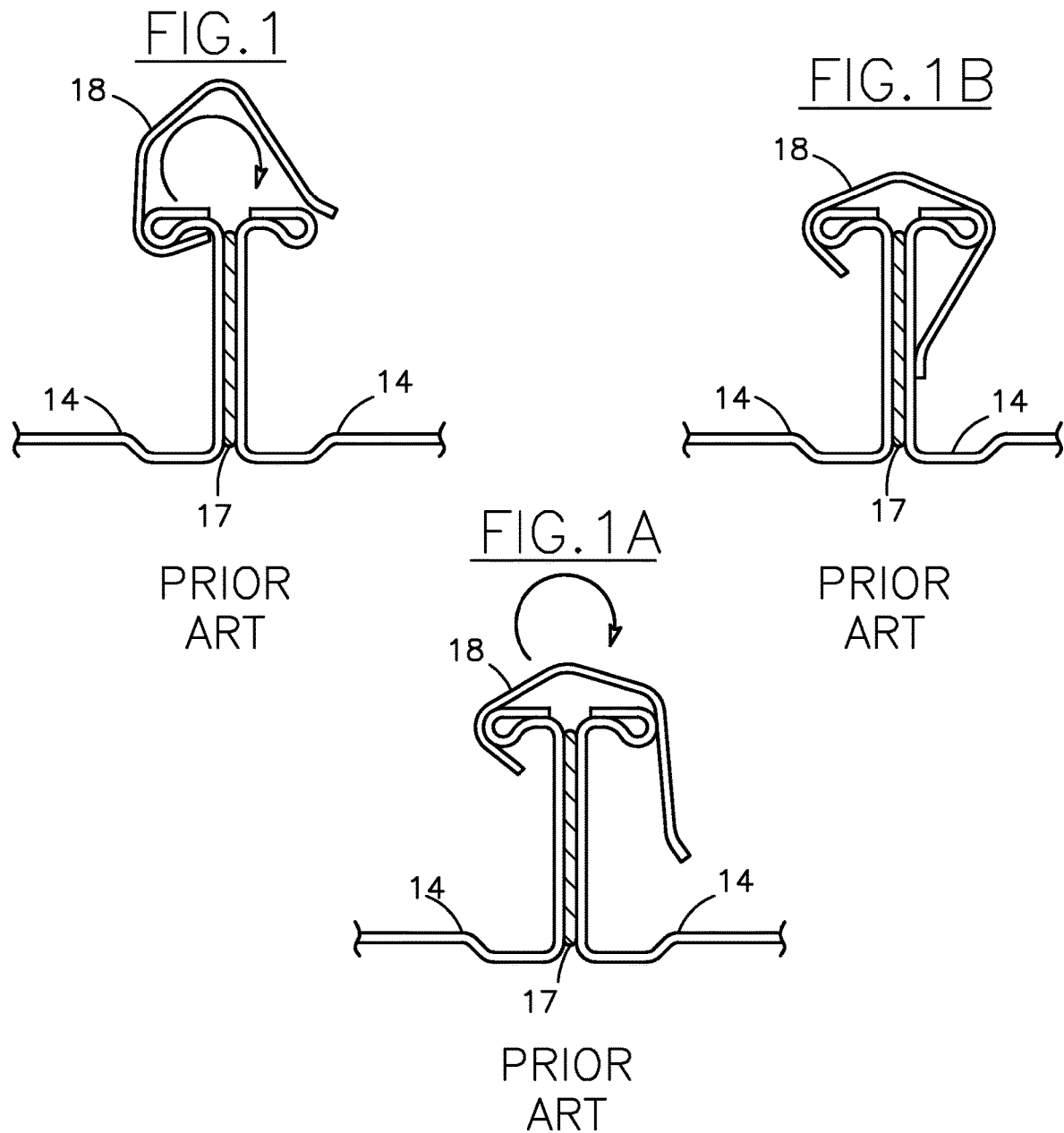

PRIOR ART

PRIOR ART

PRIOR ART

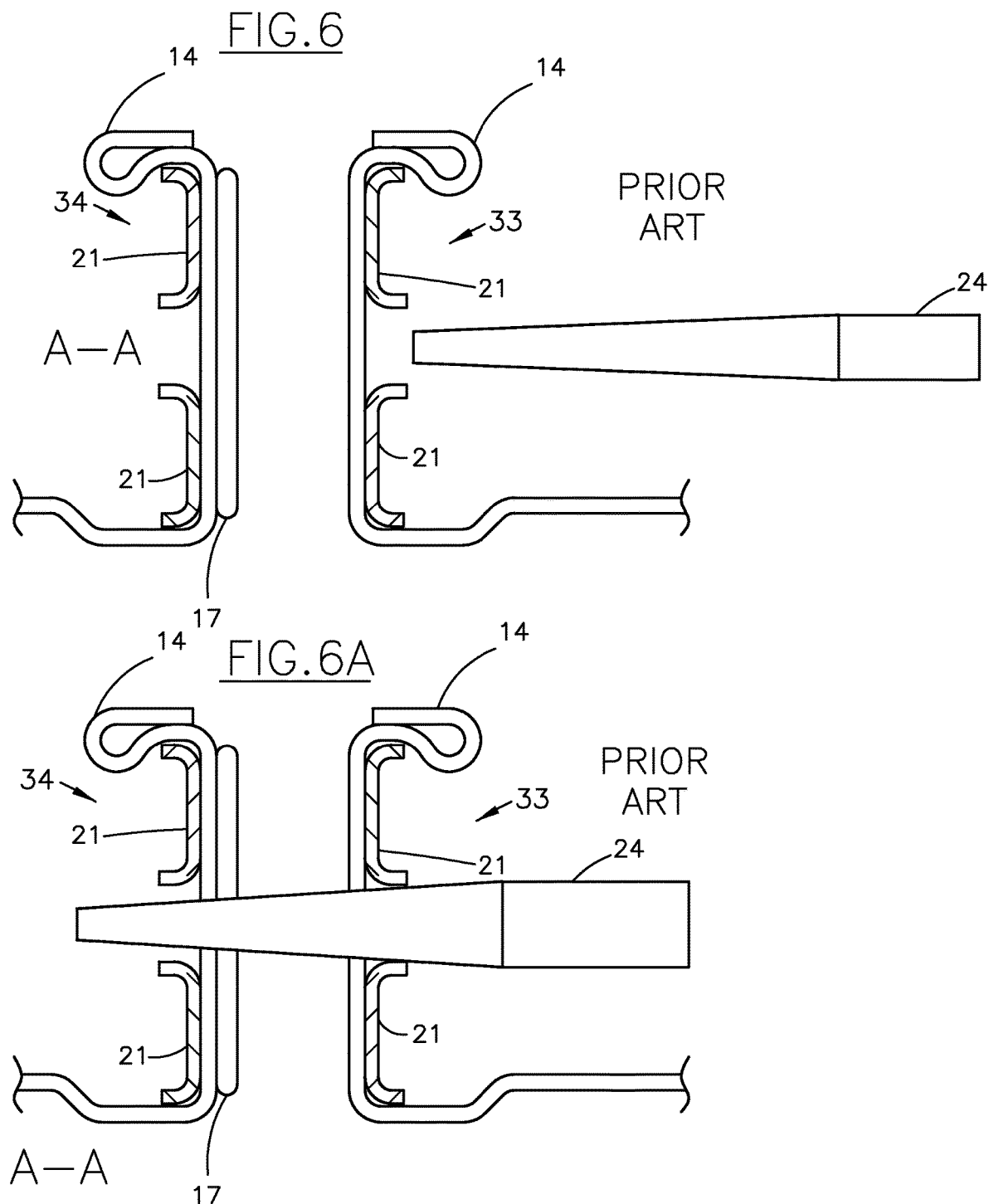

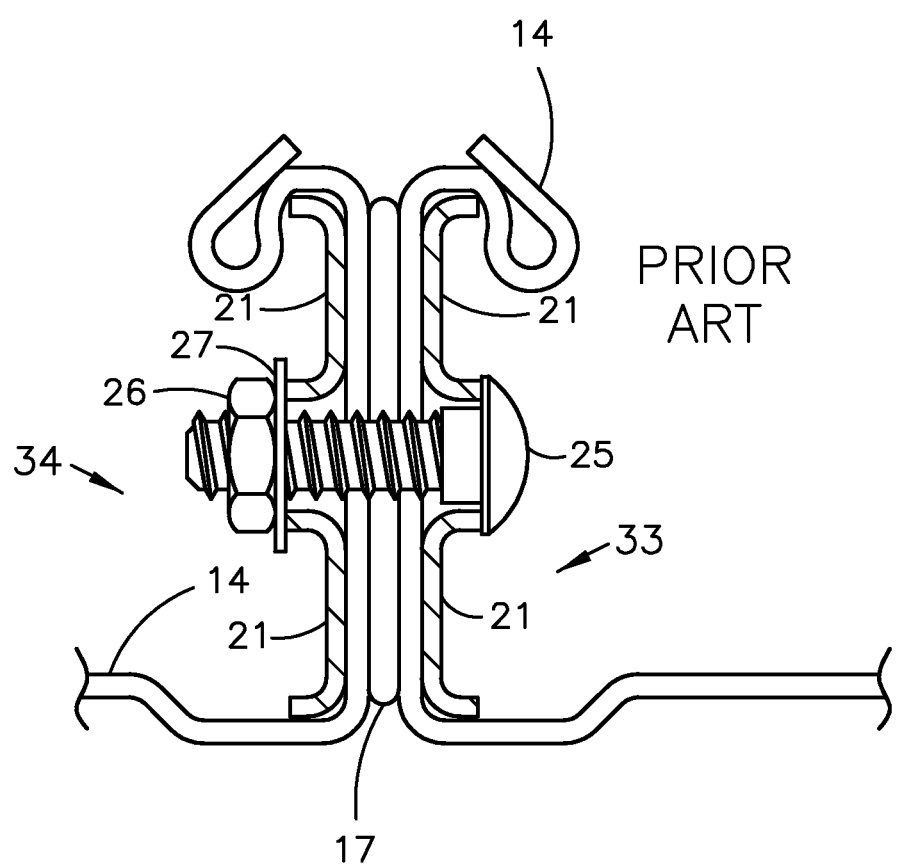

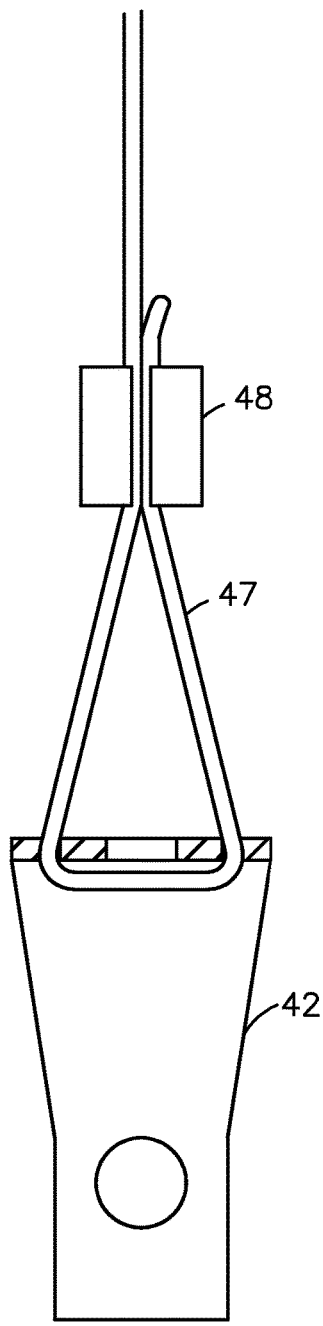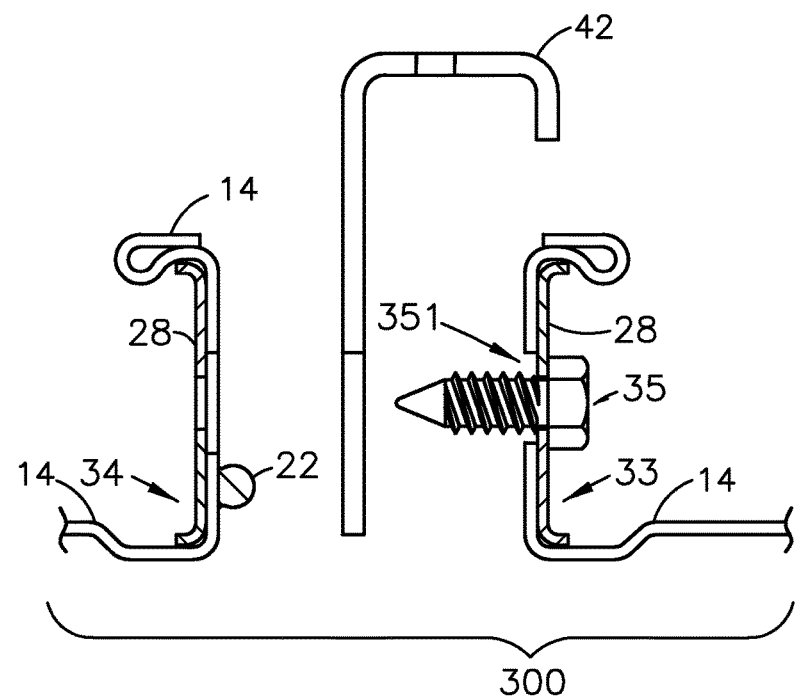
FIG. 10H
FIG. 10I

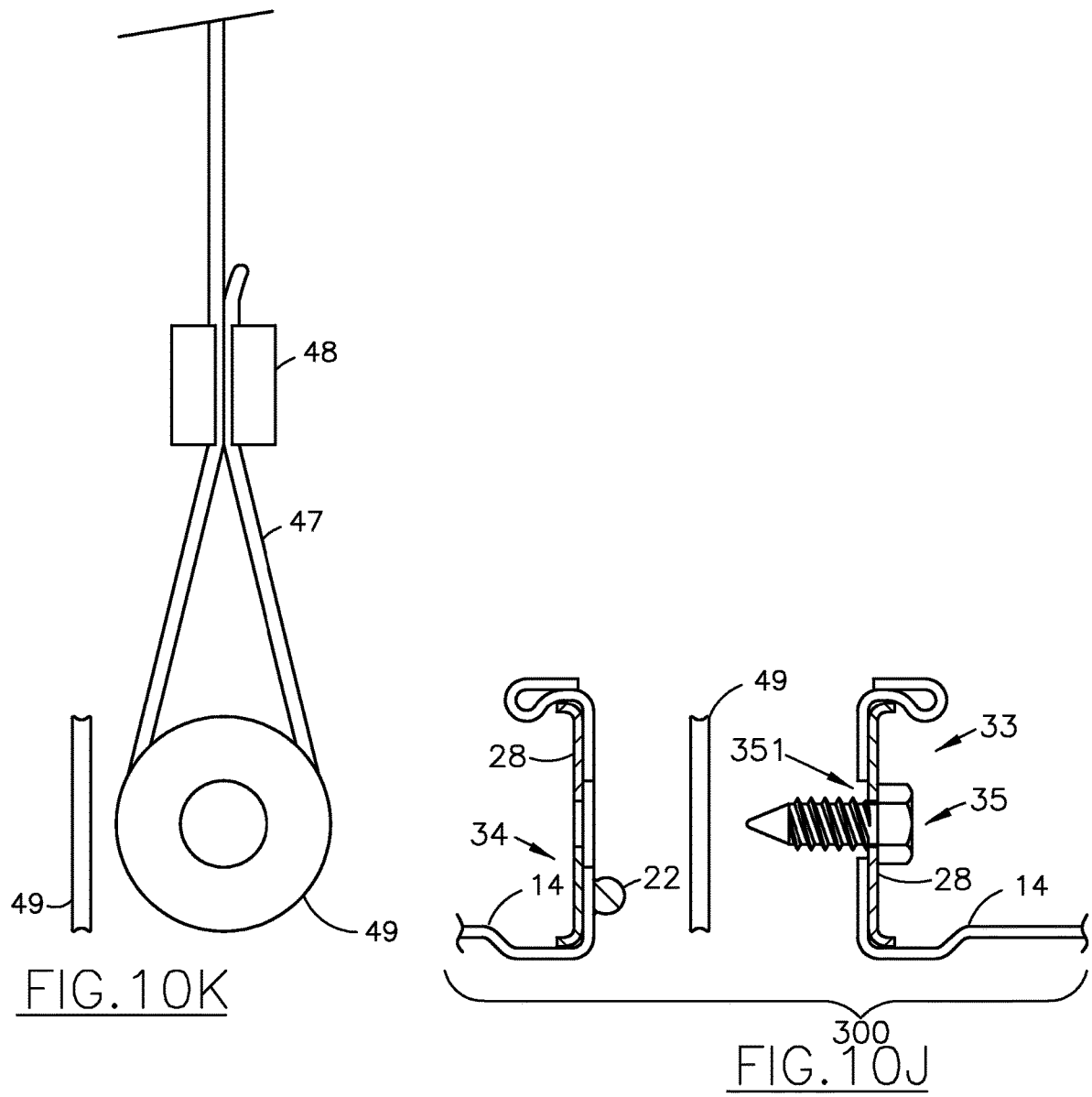

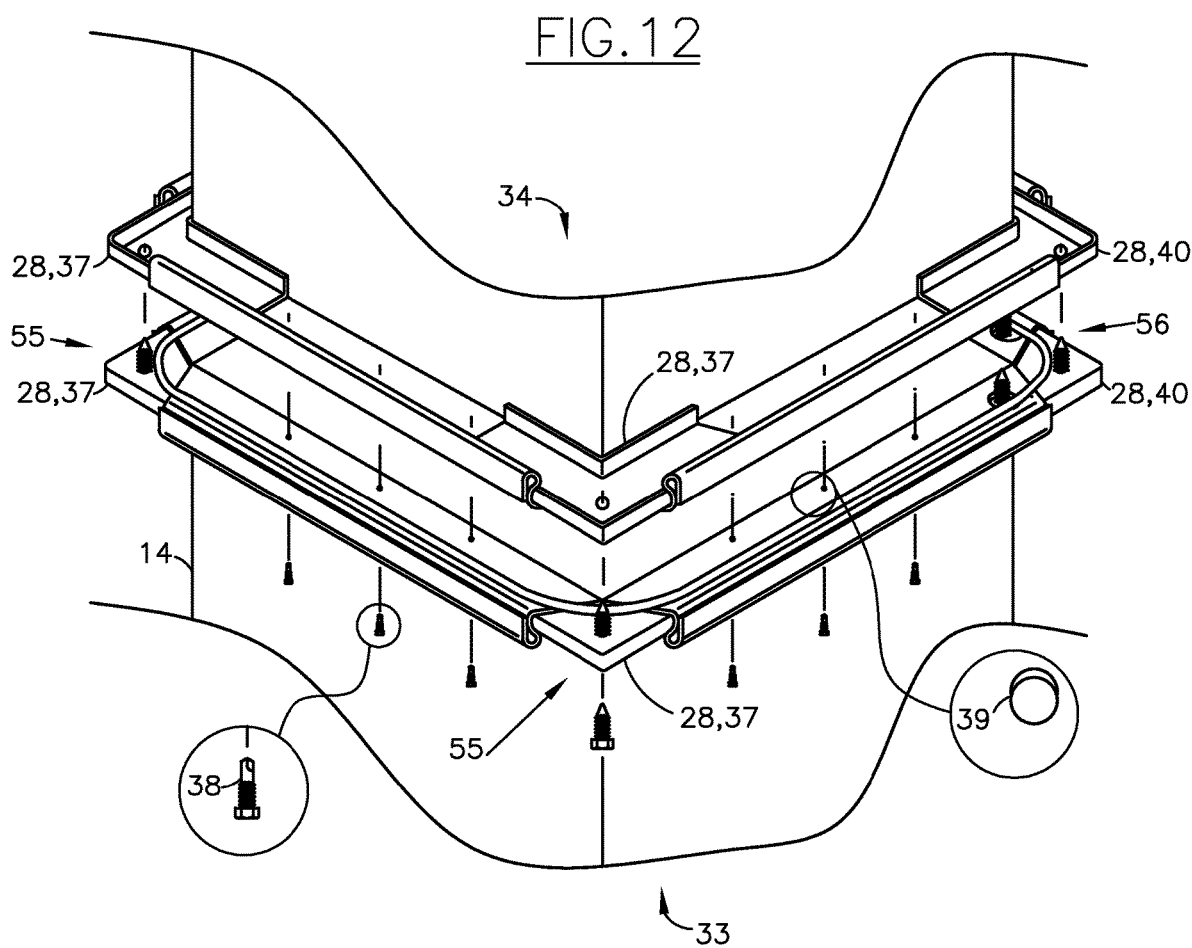

FIG.13
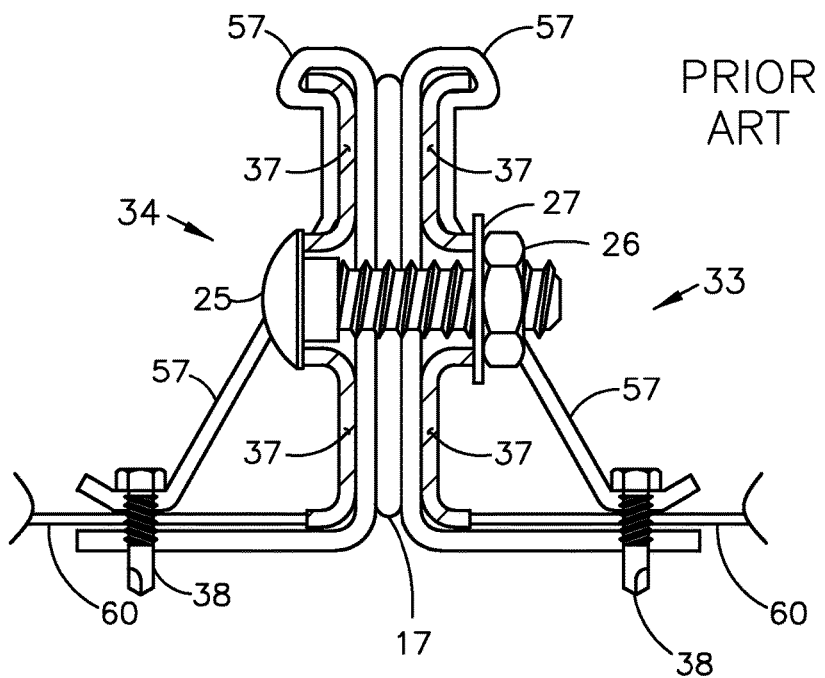
PRIOR ART
FIG.13A
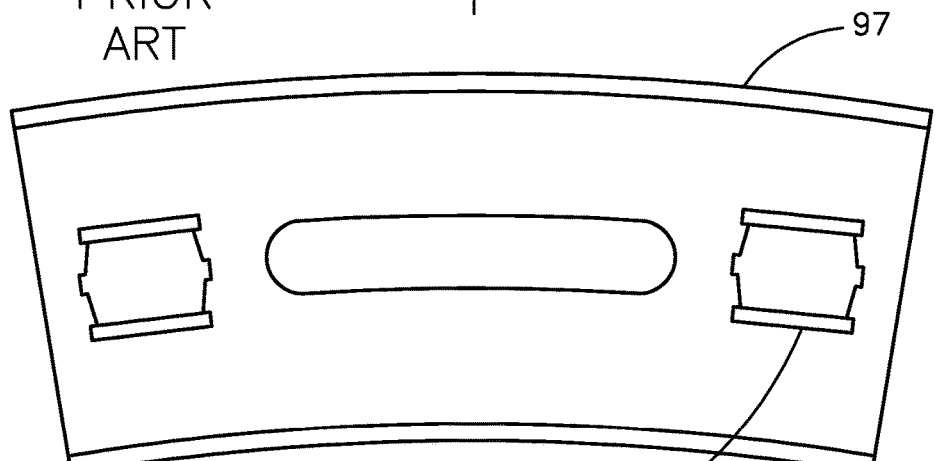
PRIOR ART
F—F
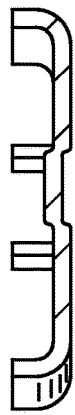
FIG.13B

PRIOR ART

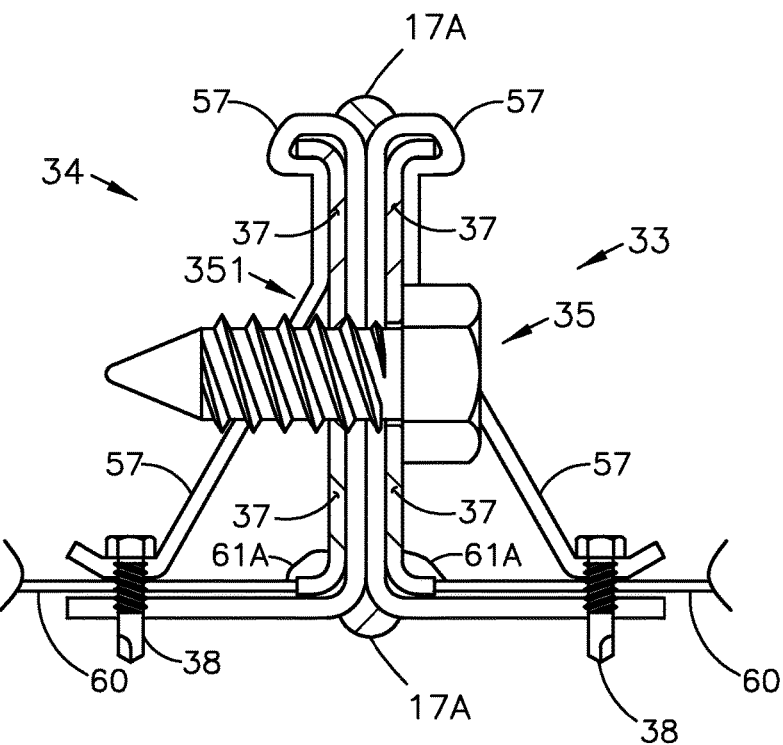
FIG. 15
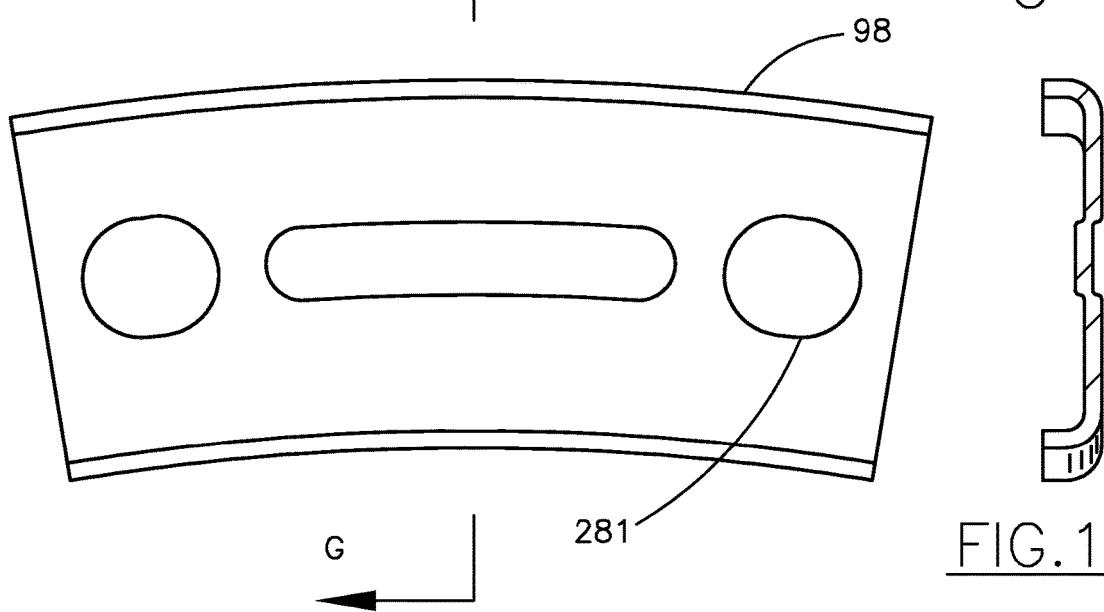
FIG. 15A
FIG. 15B

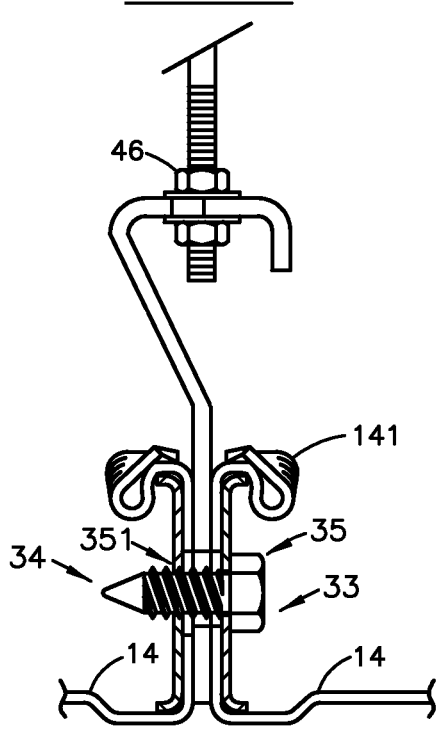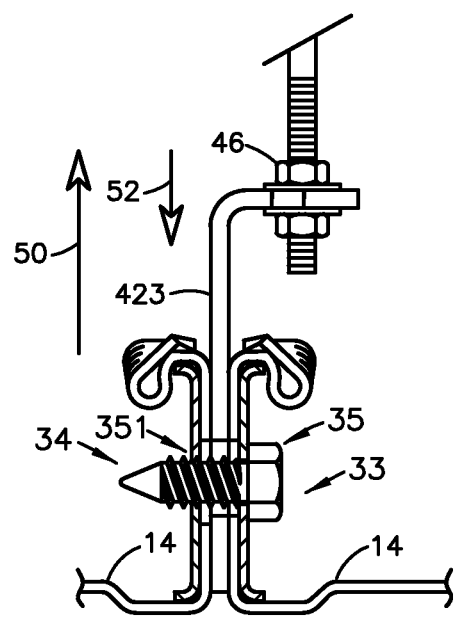

FIG. 17
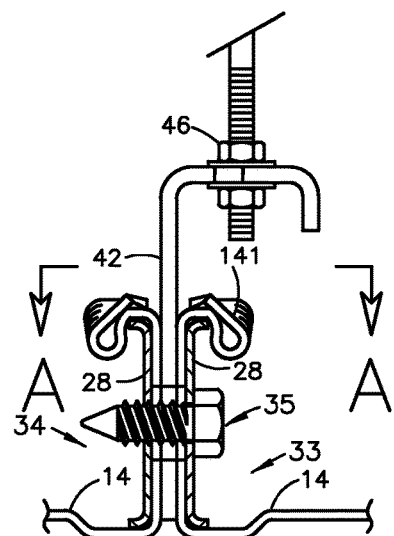
FIG. 17A
A-A
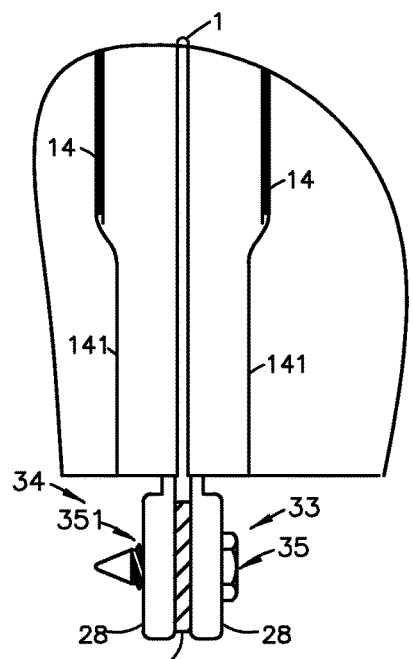
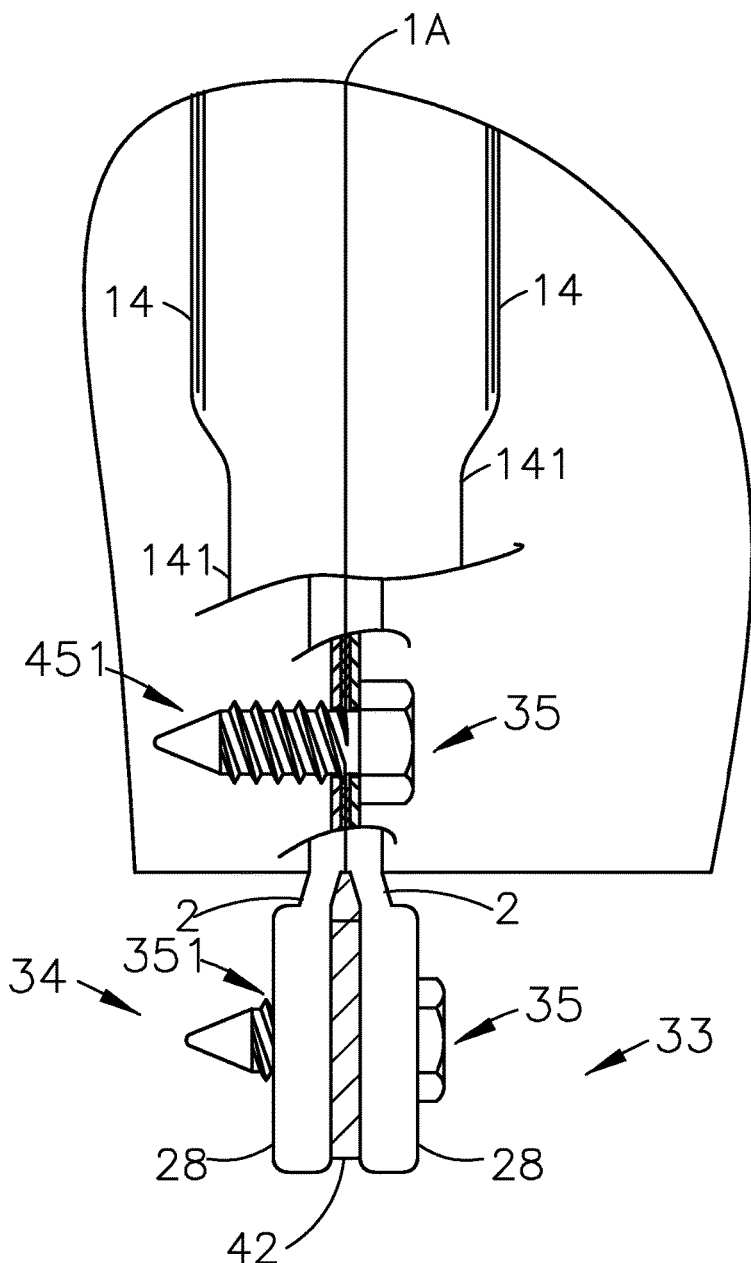
FIG. 17B

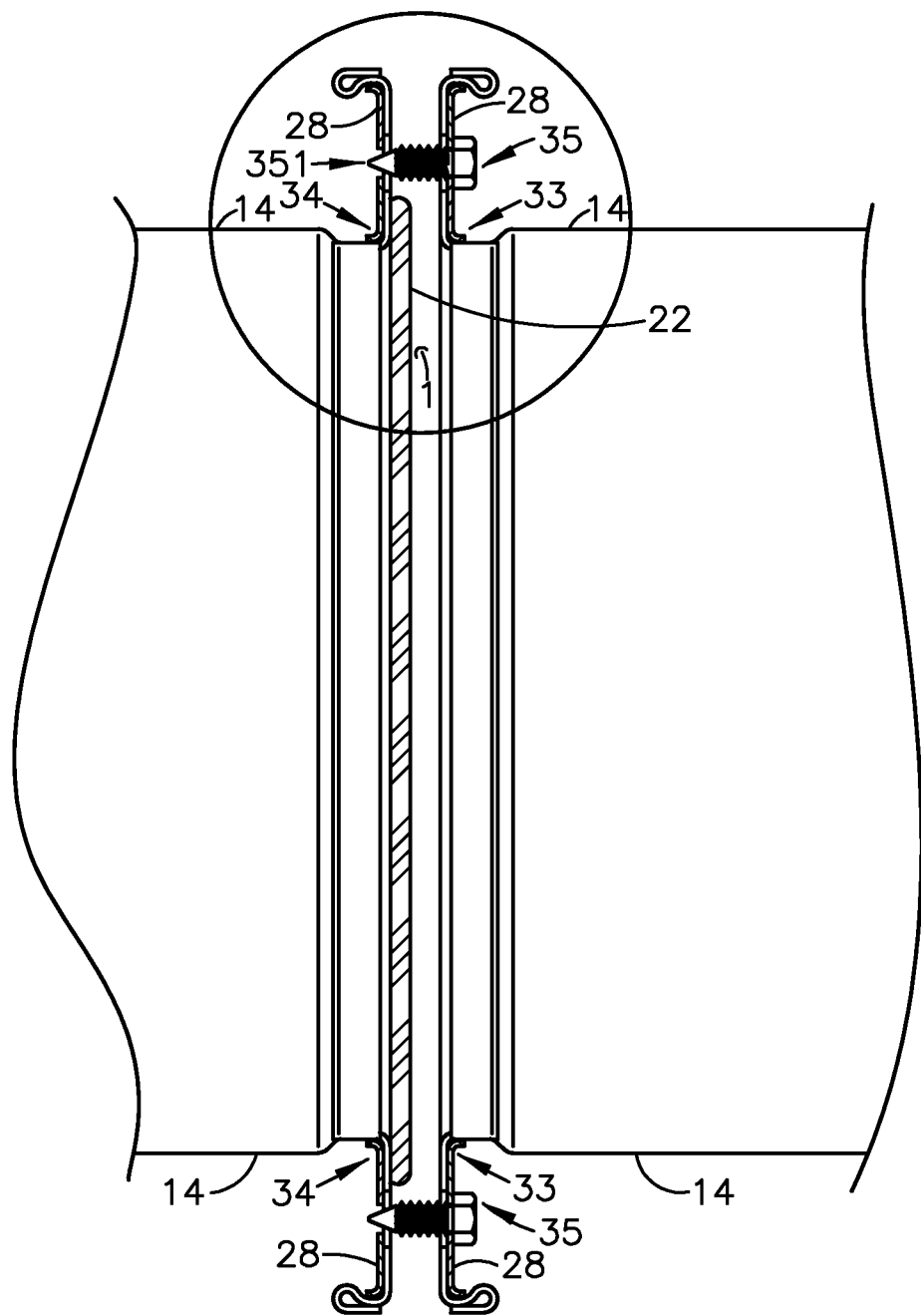

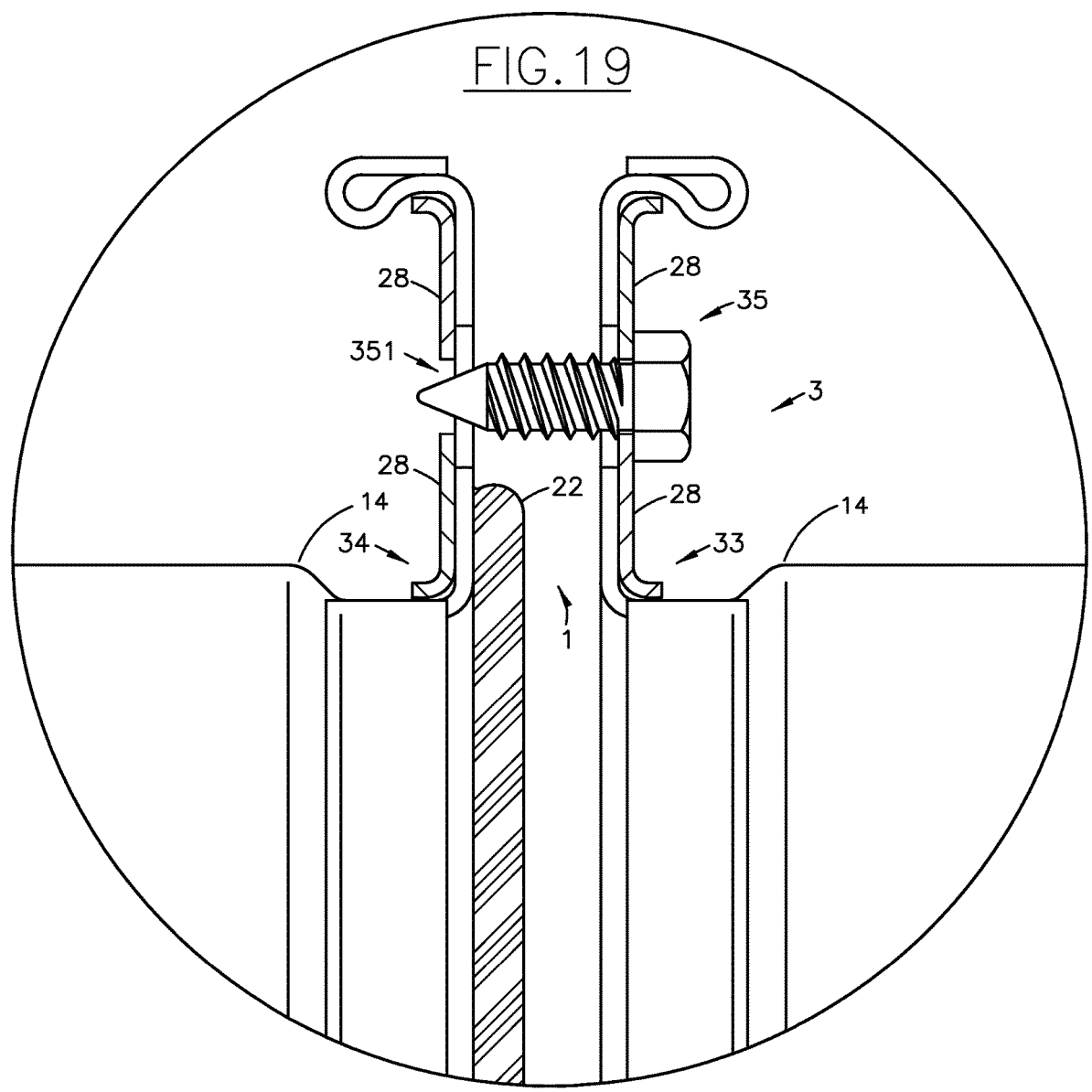

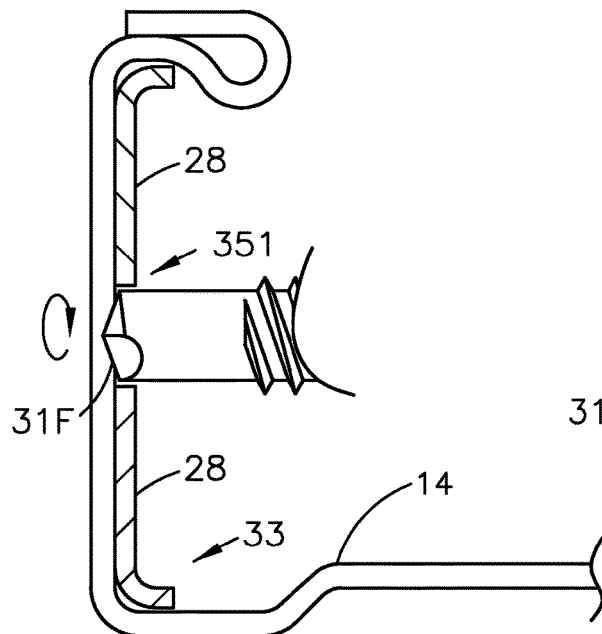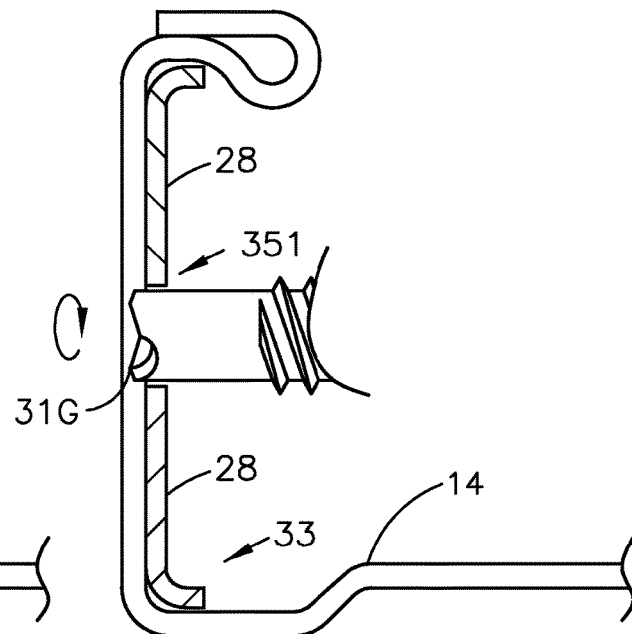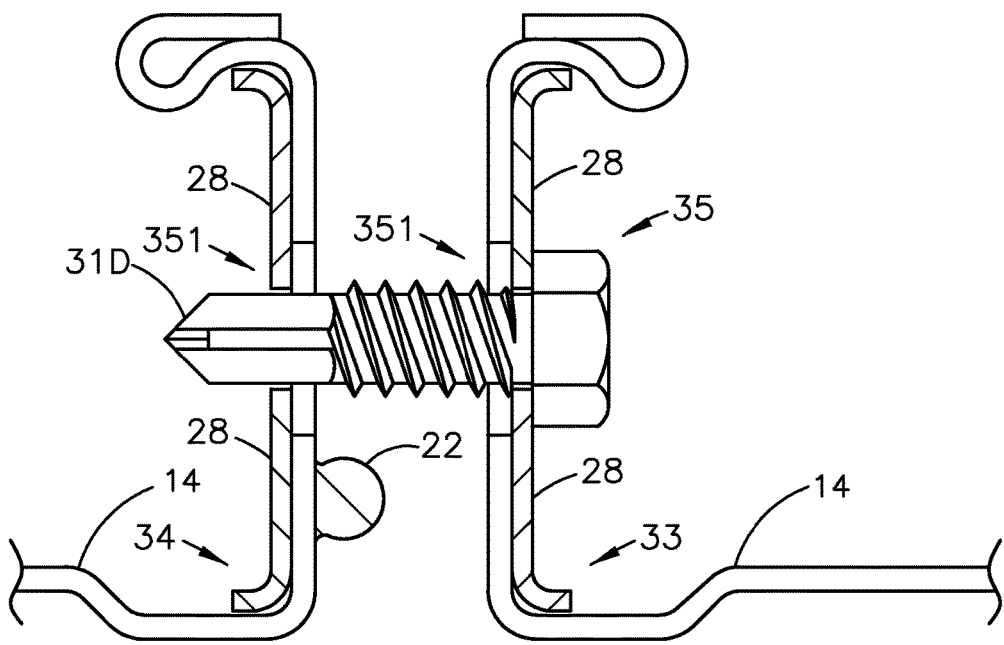

E-E

E-E

E-E

E-E

E-E

E-E

E-E

E-E

PRIOR ART

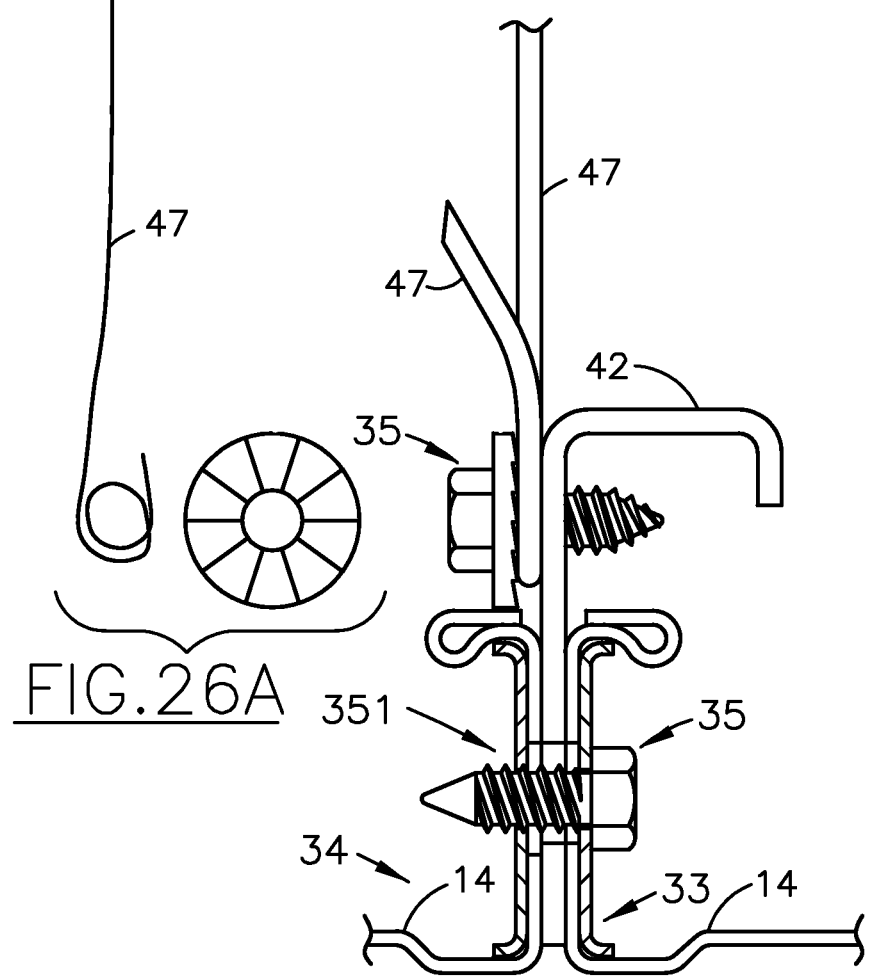

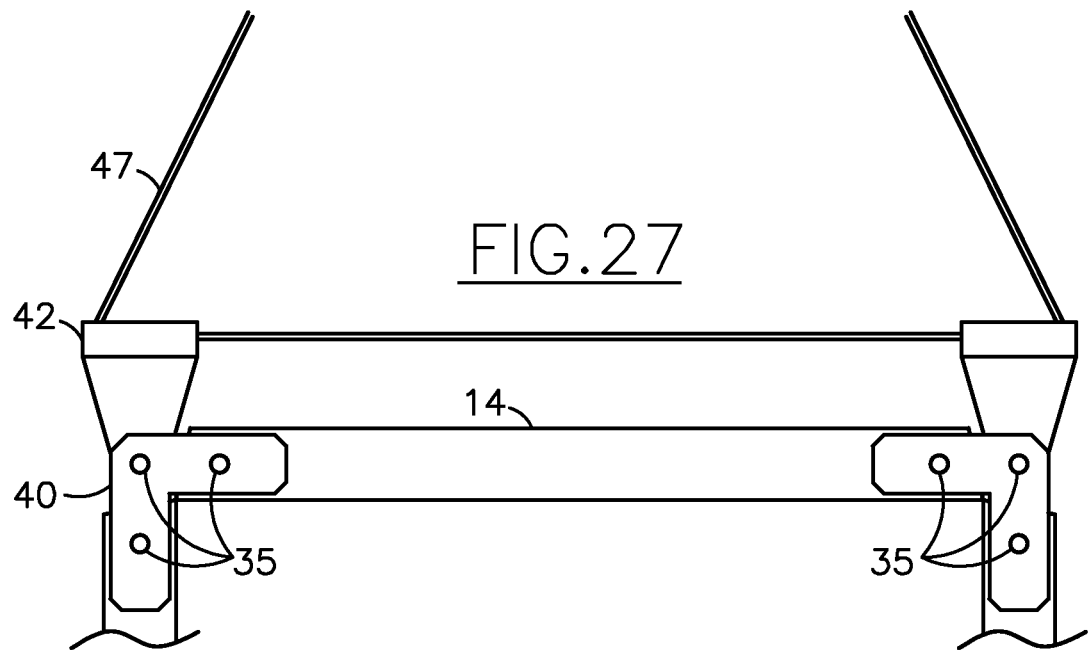
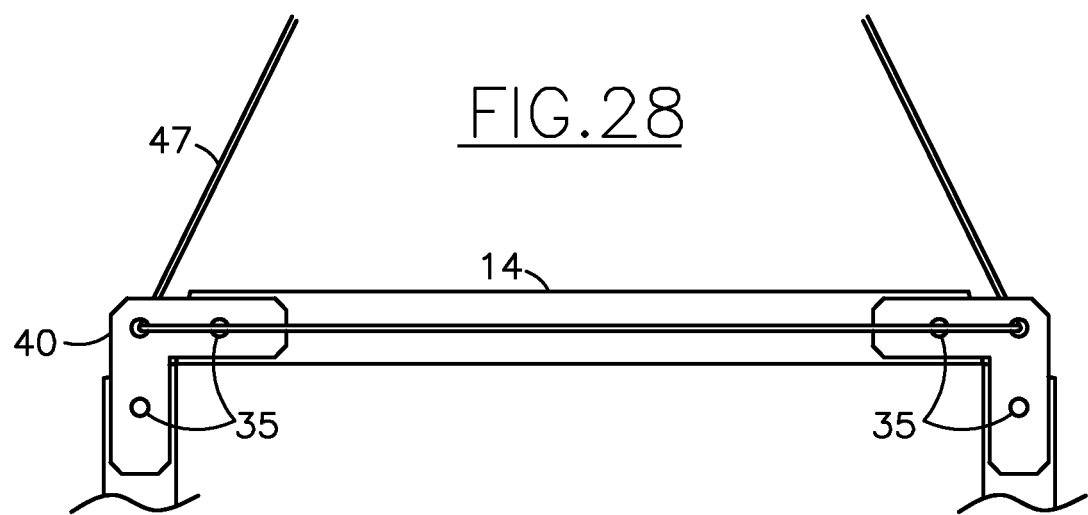

SYSTEM AND METHOD FOR JOINING AND HANGING DUCTS

CROSS-REFERENCE TO RELATED APPLICATIONS

This application is a continuation application of, and claims the benefit of, U.S. application Ser. No. 14/762,697, filed on Jul. 22, 2015, which claims priority to PCT/US2014/12738, filed Jan. 23, 2014, which application claims the benefit of U.S. Provisional Application No. 61/757,005, filed Jan. 25, 2013, all of which are hereby incorporated by reference herein in their entireties.

FIELD OF THE INVENTION

This invention relates generally to a system and method for joining and hanging ducts, and more particularly, for assembling duct sections into larger ducts using inserted corner plates, and hanging the duct sections by connection to the corner plates.

BACKGROUND OF THE INVENTION

PCT patent application Serial No. PCT/US2014/12738, filed Jan. 23, 2014; and U.S. Provisional Application No. 61/757,005, filed Jan. 25, 2013, are incorporated herein by reference in their entirety.

It is well known in the HVAC (Heating, Ventilating, and Air Conditioning) industry that manufacturing improvements in Mechanical Contractor duct shops have been highly automated through the use of automatic plasma cutting tables for making fittings, automatic coil processing lines for making rectangular duct, automatic seamer machines for closing duct seams and automatic duct flange corner plate inserter machines for inserting and crimping duct section flange corner plates securely in duct section end flanges. Round and oval duct sections are automated with machinery as well.

Prior Art documents evidencing representative known inserted corner plates and related flanges and other apparatus, are shown in Heilman et al. U.S. Pat. No. 4,466,641 and Fischer et al. U.S. Pat. No. 4,579,375. Representative known integral duct section flanges and inserted corner plates are shown in Goodhue U.S. Pat. No. 5,321,880. Fischer et al. U.S. Pat. Nos. 6,460,573 and 6,810,570 teach fasteners through corner plates and through integral duct flanges and respectively threading screws through corner plates and flanges. Fischer U.S. Pat. No. 8,172,280 discloses further improvements to inserted corner plates by providing preformed holes for threadedly receiving fasteners, which reduce required threading force.

It is also well known in the industry that improvements are needed for field installation of duct sections on the job sites. Many Mechanical Contractors are preassembling duct sections in shops and shipping them to the job site in multiple section assemblies wherever possible in order to control costs by reducing labor and improving quality. As an illustrative example, for some commercial installations, such as sports arenas, halls, auditoriums, large factories, malls, etc., it can be advantageous to pre-assemble several duct sections on the floor or ground, then lift or hoist them as an assembly, e.g., 25 or more feet in length, to a ceiling area that can be quite high, for example, 30 to 40 feet above the floor, or higher. The workers will then assemble them to an existing duct system already in place. Moving such large assemblies at such elevations can be imprecise, and is often accomplished by workers at an opposite end of the assembly pushing and/or pulling that end, to achieve precise placement and alignment of the end to be assembled with existing ducts.

Presently, aligning flanged duct sections is typically done by inserting drift pins through holes in the inserted corner plates when the duct is lifted or placed into close proximity with duct sections already positioned or hanging in place. A sticky adhesive gasket is typically adhered to one duct section and if the gasket is adhered to the other section while the sections are improperly or mis-aligned, the gasket is often difficult to detach and can be ruined, requiring removal and application of a new gasket, which is costly and time consuming. Disturbing the gasket causes openings and creates leakage problems. If this happens, more time and costs are incurred to repair the leaks adding to time required and worker frustration. A problem encountered when attempting to avoid premature adhesion is that the drift pins, while useful for general aligning, because of their tapered shape and the presence of the gasket between the duct sections, typically do not facilitate final close alignment of the duct sections for final assembly, and provide little or no ability to hold the duct sections apart while not yet fully aligned to allow workers to manually align the duct sections, such that unintentional gasket contact and adhesion can occur. Application of adhesive tape gasket is cumbersome as the tape is more readily applied with the duct section placed on the floor or ground in a vertical position with one flanged end down and the end to which the tape gasket is to be applied up. The top end is then taped with the gasket round about the duct section flange using gravity to help hold the tape in place on the flange. For a conventional duct section five feet long, this requires the taping process to be done at eye level for most workers. The tape gasket must be bent sharply around the inserted corner plate area of the flanged end of the duct section.

As noted above, for some applications at some point in the assembly process there are often several assembled duct sections on the floor or ground, that must be lifted to assemble to a duct system in a ceiling area that can be 30-40 feet or higher above the floor or ground (e.g., in a sports arena or auditorium, factory, etc.). To apply the tape with the duct section horizontal risks the tape falling off the flange if adequate adhesion isn't achieved, e.g., due to an unclean surface or during cold conditions where the adhesion is poor, etc. This problem is worsened at the tightly bent portions of tape placed around the inserted corner plate area. The tape gasket has a certain amount of memory for successful gasket performance requirements which adds to the possibility of movement and loosening especially at the bent areas of the gasket.

Once the duct sections are positioned in end to end relationship, finally aligned and brought together, as additional steps, clamps are typically applied to the flanges to hold them together in the aligned condition, and the drift pins are removed. Once the clamps are in place and the drift pins are removed, the drift pins are replaced by bolts (typically carriage bolts) through the corner plates, washers are placed over the bolts, and nuts threadedly engaged with the bolts to fasten the duct sections together through the corner plates. Only one fastener is typically used through one hole through each inserted corner plate and passes through only the corner plates. After the corner plate bolts are tightened, typically clips are securely installed using a tool to manipulate them over the outer edges of the duct section flanges in spaced relation to hold the duct section flanges forcibly against each other to provide a sealed connection. Two inch pressure class and lower SMACNA rated duct sections are sometimes fastened together with Tek screws drilled through the mating flanges. Higher pressure class duct sections are limited to spaced apart clip connections along mating duct section flanges. Observed shortcomings of this manner of final duct assembly include that the component parts are costly and must be maintained in inventory, it requires substantial labor, and is time consuming. There is also an attendant possibility of danger when assembly is done at ceiling level, of dropping component parts, so as to injure persons or equipment below. In this latter regard, conventional known clips used to clamp the flanges are known to slide down and fall from the ducts.

Fastening the assembled duct sections using Tek screws or other sheet metal screws has the desirable advantage of eliminating clips. However, presently when using Tek screws, it is still required to have the mating flanges clamped or otherwise forceably held together. This is because if a threaded fastener is threadedly engaged with two spaced apart flanges simultaneously and rotated, the fastener will pass through the two flanges at the same rate and will not bring them together. To bring the flanges together, if the fastener is not threaded all of the way to the head, the flange closer to the head of the screw will have to reach a space between the endmost thread and the head of the fastener, or, if the fastener is threaded all of the way to the head, the threads of the fastener or the flange closer to the head will have to be sufficiently obliterated, such that threaded progression through that flange will halt during the rotation and the other flange will continue its threaded progression toward the closer flange to bring them together. Shortcomings of fastening in this manner include that it is imprecise, and if the space between the head of the fastener and the endmost thread is too small to accommodate the closer flange, part of the threads will still have to be obliterated, and if the space is greater than the thickness of the two flanges and any gasket or sealant between them, the fastener may not bring the flanges close enough together to achieve the required seal. As another possible shortcoming, use of battery operated tools is currently popular for assembling ducts, and if the fastener is threadedly engaged with the flanges using a battery operated driver, the energy consumed to provide the torque required to rotate the fastener while threadedly engaged with the two flanges, and to obliterate the metal threads, will shorten battery life, requiring additional batteries, more frequent charging and related inconvenience and expense.

Addressing hanging ducts, in one representative manner of hanging, trapeze style hanger supports are positioned below the duct sections with standard overhead threaded rods placed through the trapeze style hanger supports for larger duct sections by putting nuts and washers above and below the threaded hanger support and tightening them in place. When installing, the duct must be lifted, e.g., about an inch or so, above its final position so that the trapeze support hangers can be fastened in place, and the duct is lowered onto the support. For smaller lighter ducts, slide lock clamps and cables are used by wrapping the cables around the duct and overhead supports such as beams or structures. Flat metal strips are also used to support and hang duct sections. As an observed shortcoming of use of hanger cables wrapped directly about the ducts, it has been found that normal operational vibration of the duct can cause the cable to "saw" or "cut" into the duct walls resulting in the problem of leakage. As a manner of reducing complexity of hanging, it would be desirable to incorporate hangers into the duct assembly, and more particularly to attach hangers to the flanges of the duct sections as they are assembled so that the hangers will be located over and directly support the assembled duct joints. However, with the current manner of duct assembly involving steps of aligning and bringing together with drift pins, clamping, removing the drift pins, then inserting bolts through the holes, it would be difficult to incorporate addition of hangers, as inserting them between clamped flanges would be difficult, and they would have to be blindly aligned with the holes through which the bolts are inserted. If it is attempted to place the hangers on the drift pins prior to assembly, there is nothing to hold the hangers on the smooth tapered length of the drift pins, and the weight of the hangers can cause the drift pins to tilt down and increase the difficulty of properly aligning the duct sections. There is the possibility of placement of the hangers on the ends of the bolts after passage through the crimped flanges and the inserted corner plates, but then the hangers may interfere with crimped edges of the associated flanges, and/or require an additional nut for securing. The crimp may also be poorly done and loosen under load.

As another issue for consideration, smaller duct sections are often used at locations in duct systems farther from the larger supply duct sections and are typically connected to the larger duct sections by transitioning from flanged ducts to slip- and drive-on connections. Flanged ducts are flanged top and bottom and on both sides. The flanges may be integrally formed or slide on style. As many duct sections as are practical to lift into position safely are often preconnected at floor level to provide better access to and control of the connection process and efficiency. Difficult to reach flange connections are more accessible with the use of magnetic socket wrenches and extensions that are power driven rotationally. Job site conditions such as stored materials for other contractors often make it desirable to get the duct sections in place as quickly as possible for safety and efficiency, and to avoid and reduce delays and interruptions of other job site work. In this regard, scheduling duct section lifting and hanging is often also difficult due to other job site work, e.g., presence of contractors such as plumbers, electricians and others needing the same work space.

Thus, what is sought is a manner of assembling and hanging duct sections using inserted corner plates, that is more efficient and productive, particularly in terms of field or job-site assembly, simpler, and easier than known methods and systems, and overcomes one or more of the shortcomings and limitations set forth above.

SUMMARY OF THE INVENTION

What is disclosed is a system and method of assembling and optionally hanging duct sections using inserted corner plates, that is more efficient and productive, simpler, and easier than known methods and systems, and overcomes one or more of the shortcomings and limitations set forth above.

According to a preferred aspect of the invention, the system and method of assembling duct sections uses large sheet metal screws of the invention through alignable holes through opposing inserted corner plates of the duct sections, with as few as one large sheet metal screw per corner plate. The large screws are first threadedly engaged with holes through inserted corner plates of a first of the duct sections to be assembled. The screws are specially configured according to the invention so that when fully received in the holes through the corner plates of the first duct section, the large screws project outwardly therefrom and are robustly self holding in substantially perpendicular relation thereto, along a predetermined alignment axis through the hole, so as to be usable for aligning the two duct sections. The screws are also configured to be used to initially contact the inserted corner plates of the second duct section in a manner to hold the two duct sections apart sufficiently such that any gasket or sealant on flanges of one of the duct sections is prevented from contacting and adhering to flanges of the other, to allow final alignment. This contact can be made without threaded engagement with holes through the corner plates of the second duct section, or only partial engagement of the thread with the holes through the second corner plates, so as to allow relative movement and realigning as required to achieve the desired final positioning. Once final alignment is achieved, the large screws are threadedly engaged with the holes through the corner plates of the second duct section to bring together and assemble the duct sections. As the flanges of the duct sections are brought together to close the gap therebetween, the sealant or gasket is compressed to form a sealed condition between the flanges. Additional screws or other fasteners can then be used as required at other locations on the assembled mating flanges, particularly for larger ducts, to strengthen and stiffen the assembly and compress the sealant or gasket in areas spaced from the corner plates. As an additional feature, a dimple or hole pattern can be provided in the flanges and fasteners used in association therewith for increasing strength of the assembly. The screws also won't slide such as clips often do.

As an advantage, duct sections, including preassembled longer duct sections comprising several individual duct sections, can be aligned for assembly without risk of being adhered together when misaligned. As another advantage, the duct sections are securely brought together and assembled quickly and easily, with just the large screws through the inserted corner plates, with no need for hand threading of nuts onto screws or bolts, dropped nuts or washers, and other related problems.

As another advantage, the large size of the screws enable them to replace drift pins currently used for aligning. The screws, because they are self holding in fixed relation projecting from the first duct section when fully received in the holes of the corner plates thereof can be used both to hold the duct sections apart for initial aligning, and then to guide the bringing together of the duct sections. Then, the screws when threadedly engaged with the corner plates of the second duct section, provide a force to bring the duct sections together, as well as holding strength when the duct sections are finally assembled.

According to another preferred aspect of the invention, the corner plates and large screws are configured to function together as a system. In this regard, the opposing inserted corner plates have preformed holes of a size and shape for threadedly receiving the large screws, respectively, and positioned so as to be aligned when the associated duct sections are positioned for assembly. The corner plates also have a predetermined thickness measured through the preformed holes. The large screws have an elongate shank with an enlarged head at one end and a tip at the opposite end. The shanks of the screws each have a threaded portion adjacent to the tip configured for threaded engagement with a selected hole of a corner plate. The threaded portion terminates at an endmost thread located a predetermined distance from the head about equal to the predetermined thickness of the corner plate through the hole, bounding and defining a space between the endmost thread and the screw head configured to receive the corner plate when the screw is fully received in the hole. The endmost thread is also preferably specially configured, along with the head of the screw, to cooperate with a corner plate in which the screw is fully received, such that the screw will be securely self-holding in a substantially perpendicular orientation relative to an adjacent surface of the corner plate, and also substantially coaxial with a predetermined alignment axis through the hole, and the screw can rotate within the hole. As a functional example of the utility of this latter capability, the screw can be rotated within the corner plate of the first duct section as the screw is threadedly engaged with the corner plate of the second duct section to bring the duct sections together.

As an additional preferred feature and advantage of the invention, the special configuration of the endmost thread is also operable to prevent, or obstruct or interfere with, re-engagement of the thread with the corner plate. In its simplest form, this special configuration includes a surface on the endmost thread bounding the space between the head and endmost thread, which is at least generally parallel to the opposing surface of the head and is shaped so as to partially obstruct the groove between the endmost thread and the next adjacent thread of the threaded portion of the screw to prevent re-entry of the corner plate into the groove. As another non-limiting example, the endmost thread can extend into the groove toward the next adjacent thread head at a steeper angle than the normal pitch angle of the thread. As another example, the end of the endmost thread can have bulbous or similar shape that prevents re-engagement of the thread, such as a teardrop or partial teardrop shape. As a non-limiting example, to provide the above capabilities, a substantial portion, e.g., 20 to 40 percent of the endmost thread can be generally flat and parallel to the opposing surface of the head, and bounds the space so as to form a bearing surface for opposing forces exerted between the endmost thread and an opposing surface of a corner plate located in the adjacent space, that combined with forces exerted between the opposite surface of the corner plate and the screw head, will be sufficient to hold the screw in the desired substantially perpendicular orientation relative to the corner plate under anticipated conditions, e.g., forces exerted thereagainst by movements of the duct sections for aligning them for assembly.

According to another preferred aspect of the invention, the pitch of the thread is about equal to the thickness of the respective corner plates measured through the holes, and the holes of the corner plates are shaped, such that the screws can be tilted at a small approach angle relative to the corner plate of the first duct section, and also the alignment axis through the hole therethrough, to engage the thread with that corner plate such that the thread of the screw can pass through the hole of that corner plate without the corner plate itself being pre-threaded or the screw thread forceably cutting a new thread or otherwise deforming a surface of the corner plate adjacent or about the hole. This is also advantageous as it reduces or can virtually eliminate the torque necessary for threading the screw through the plate to save energy when a battery powered driver is used. The insertion is capable of being done very quickly, saving labor. As an additional feature, when the endmost thread has passed or passes through the corner plate, the head of the screw will abut, or be close to and directly face, the surface of the corner plate about or adjacent to the hole, to cause the screw to automatically transition to and maintain the perpendicular orientation relative to the plate even under the lateral loading conditions anticipated to be encountered from relative movements of the duct sections being assembled, so as to be useful as a guide for aligning the duct sections.

In regard to transitioning of the screw from the tilted to the perpendicular orientation, the endmost thread is configured to be robust so as to accomplish the transition, e.g., with a pivotal or leveraged movement, without bending or breaking, and without application of a substantial force, and the occurrence of the transition can serve to signal the operator of a screw gun or other automatic or powered rotation tool or driver that the screw has achieved the fully engaged position in the corner plate of the first duct section along with the sensation and/or sound that the screw is rotating freely within that corner plate. The change from tilted to perpendicular may also be observed as a visual cue.

As noted above, when at least one of the large screws is fully received in a corner plate of the first duct section, the screw or screws can be used as a tool or guide for bringing the duct sections into alignment for assembly. As a further aspect of the invention, when the duct sections are aligned, and ready to be assembled, the at least one of the large screws is threadedly engaged with an associated corner plate of the second duct section. This threaded engagement, and that of the subsequently engaged screws, will preferably differ from that with the corner plate of the first duct section in that that the screw will deform or cut a thread in the material of the corner plate of the second duct section in the normal manner of threaded engagement with sheet metal. As a result, the screw threadedly engages the two corner plates in different manners. Regarding the second, the deformation of the second corner plate is advantageous as it allows the corner plates to be brought together in parallel relation, at least as they or the sealant or gasket between the flanges of the mating duct sections are brought into final abutment.

If it is desired to incorporate a hanger into the assembly at one or more locations, this is easily done by placing a narrow hanger bracket between the corner plates to be fastened together, such that the threaded shank of the associated screw extending from the corner plate of the first duct section extends through a hole in the hanger bracket. The assembler can then simply hold the hanger bracket as the flanges of the duct sections are brought together, or the hole through the hanger bracket can be sized such that the bracket will be self-retained on the threaded shank in a desired orientation by engagement with the screw threads, and the screw rotated in engagement with the corner plate of the second duct section, to clamp the bracket between the joined together corner plates. Non-limiting examples of suitable hanger brackets include sheet metal brackets configured for attachment to a conventional threaded rod, and a radiused element to be partially encircled by a cable. If desired, additional Tek or other sheet metal screws can then be threaded through the mating flanges of the duct sections in close proximity to the bracket, to deform one or both of the flanges about the bracket to capture it and ensure a complete seal thereabout. As another option, one or more of the corner plates can include a feature or element configured for attachment or connection to a hanger, such as a rod or cable, to allow hanging the associated duct section prior to, during or after assembly with the other duct section.

According to another preferred aspect of the invention, the large screws can include a variety of tips on the shanks of the screws. As a non-limiting example, a tapered or pointed, non-threaded and non-drilling tip can be provided on the screw, configured to serve as a pilot received in a pre-existing hole in the inserted corner plate of the second duct section when in aligned opposing relation to the hole in the inserted corner plate of the first duct section when the duct sections are aligned or in mating relation. As another non-limiting example, the screw can have a more blunt self-drilling tip, in the manner of a hollow hole cutting drill or trepanning bit, so as to have the capability of both drilling through the flanges of both duct sections and serving as a pilot for aligning purposes. As still another non-limiting alternative, the screw can have a conventional spade type or tapered threaded tip typically found on commercially available Tek screws for sheet metal applications. For the latter two examples, an existing hole through an inserted corner plate can be used as a drill guide, for controlling location of additional holes through a flange or flanges, or associated corner plate to prevent walk-off when drilling.

To summarize, the invention provides a manner of assembling duct sections, including at elevated locations above a floor or the ground, using inserted corner plates and large sheet metal screws such that the screws can be easily rotated through the corner plates and an optional hanger bracket. The duct sections will have flanges having openings in the corners sized for use with the large sheet metal screws for allowing the screws to pass through both the flanges and the inserted corner plates.

As also explained above, the corner plate has an opening or openings that allow threaded engagement with a threaded portion of the screw on a tilt or approach angle that allows the threads to pass through the corner plate without the need to forcibly cut threads. The corner plates can be of various configurations having bends along the edges or merely be flat. The openings can be of various configurations. As one non-limiting preferred embodiment, the corner plate has a diamond shaped hole with contoured corners at two opposing corners of the hole. As another non-limiting preferred embodiment, the corner plate has a teardrop shape hole with one corner. In both of these embodiments, the hole is of a size that is only marginally larger than the root diameter of the screw to allow the screw to threadedly engage the hole and pass therethrough but also allows the hole to serve to guide the drill point of a self-drilling hollow ended screw or other type of drill end. Other optional shapes can include, but are not limited to, rectangular, oval, round, eye, or a composite of the shapes. A standard drill bit can also be used to drill through integral duct section flange ends with inserted corner plates even though the flanges are not pre-punched or otherwise have no opening provided.

According to another preferred aspect of the invention, the large screws can be rotated by a powered hand tool or driver through two corner plates of the duct section so at least two screws are held in position and are located with the screw and pilot portion extending adequately for alignment contact with mating openings in the adjacent connecting duct section. An endmost thread adjacent to an unthreaded space has the above-described special configuration that serves as a locking feature next to the screw head such that the screw is easily inserted to the proper depth so as to protrude adequately for alignment, spacing apart for gasket protection and fastening of mating duct sections. Two screws used to align the duct sections are tightened with a power tool quickly with the use of one hand while freeing the other hand to stabilize the duct sections or the worker as may be needed. Once the two screws are tightened through the mating duct flange corner plates, the remaining screws, hanger or hangers are quickly placed and tightened.

Once the large screws are tightened, Tek screws can be drilled through the mating flanges free handedly or by first positioning them in pre-punched holes or dimples provided, as needed to provide desired strength, rigidity, and sealing.

As evidenced by the above discussion, the present invention creates a new, faster, safer and stronger method of assembling and hanging rectangular or other duct sections thus providing needed improvements for field workers who are required to assemble and hang duct section assemblies and sections in elevated and potentially dangerous areas on jobsites.

The present invention allows the use of semi-liquid caulk gasket provided in tubes for easy application in any orientation thereby allowing the duct section to remain horizontal where it is much easier to see and to apply the gasket materials. The duct section can also remain oriented in the horizontal position used when connecting, shipping, hanging the duct sections or for simply moving them around on carts or skids.

According to another preferred aspect of the invention, the special configuration of the endmost thread of the screws of the invention are formable in a cost controlled manner by roll forming the threads such that a segment of the endmost thread closest to the screw head, e.g., 20 to 40 percent about the circumference of the screw shank, is substantially parallel to the screw head so as to be capable of bearing against an adjacent surface of a corner plate located in the space between the endmost thread and the screw head for operation in cooperation with an opposing surface on the screw head, to hold the screw perpendicular to an adjacent surface of the corner plate under anticipated external loading conditions, such as would result from manipulating duct sections into position to be assembled. Additionally the present invention provides a screw with more threads that are spaced for the thickness of one sheet metal section as opposed to two sheet metal thicknesses, providing a larger thread engagement area. The substantially perpendicular orientation of the screw when fully received in the hole of the corner plate of the first duct section is advantageous as it preferably orients the screw in perpendicular relation to a major surface or surfaces of the corner that abut the flange of the associated duct section, so that the screw is coaxial with an alignment axis that will extend through that hole and also the hole through the corner plate of the duct section to be assembled therewith when the duct sections are positioned or aligned for assembly.

The present invention addresses these issues such that less hanging time is needed so that other contractors will be allowed greater time for their needs. The current invention provides solutions to many job site situations along with improving quality and increasing the connection strength. The same solutions are provided for the production floor.

BRIEF DESCRIPTION OF THE DRAWINGS

FIG. 1A is another cross sectional view of the prior art duct connection showing the clip in a partially installed position.

FIG. 1B is still another cross sectional view of the prior art connection showing the clip in its fully engaged position.

FIG. 3A is an end view of the role of gasket tape showing non-stick tape each winding of the gasket.

FIG. 6 is a sectional view of a prior art pair of duct section flanges with corner plates inserted and a drift pin in close proximity.

FIG. 6A is another sectional view of the prior art duct section flanges showing the drift pin partially inserted through the duct section flange and inserted corner plates.

FIG. 6D is another sectional view of the prior art duct section flanges shown finally assembled without the clamp.

FIG. 10-1 is a sectional view of the two duct flanges with the screw tilted relative to an alignment axis through aligned inserted corner plates of the flanges and partially threadedly engaged with the hole of a first of the inserted corner plates, and showing a thread pitch of about one sheet metal thickness (thickness of corner plate) between the adjacent threads of the screw.

FIG. 10-2 is an enlarged side view of an unthreaded space between the head of the screw and an endmost thread of a threaded portion of the screw, showing an extent of the endmost thread in parallel relation to an opposing surface of the head and extension of the endmost thread into a groove between the endmost thread and the next adjacent thread.

FIG. 10H is a side view of a cable hanger bracket.

FIG. 10I is an assembly drawing of the cable hanger bracket disposed between two duct section flange assemblies for clamping therebetween.

FIG. 10J is an assembly drawing of an alternative cable hanger bracket disposed between two duct section flange assemblies for clamping therebetween.

FIG. 10K is a side view of the alternative cable hanger bracket, a cable support and a cable clamp.

FIG. 10M-1 is a sectional view CC showing the endmost thread of a threaded portion of the screw.

FIG. 10M-2 is a section DD showing the hole through the inserted corner plate and an area of locking interference of the endmost thread and an edge of the hole.

FIG. 12 is a fragmentary perspective view of two mating duct section flanges with inserted corner plates in spaced apart alignment for assembly with a caulk bead in place there between and a combination of a single screw and triple screw connection, along with Tek screws and pre-made holes at spaced locations along the flanges.

FIG. 13 is a sectional view of a prior art generic slide on duct section flange connection for rectangular, round, oval or other duct sections with slide on flanges positioned on un-flanged ends of duct sections, assembled with a carriage bolt.

FIG. 13A is a side view of an inserted corner plate of the connection of FIG. 13.

FIG. 13B is an end view of the corner plate.

FIG. 15 is a sectional view of a slide on flange connection according to the invention, for sealing rectangular, round, oval or other duct sections for rectangular and other style duct ends.

FIG. 15A is a side view of the slide on flange.

FIG. 15B is an end view of the slide on flange.

FIG. 16 is a side view of an inserted corner duct flange connection clamping a center loaded hanger bracket.

FIG. 16A is a side view of an inserted corner duct flange connection clamping an alternative hanger bracket.

FIG. 17 is a sectional view of an inserted corner duct flange connection clamping a hanger bracket and showing connection with a hanger rod and a space between the flanges.

FIG. 17A is an enlarged sectional view of the connection through the hanger bracket, showing the flanges brought together by bending the corner plates and flanges with an added screw through the flanges alongside the hanger bracket to close the space.

FIG. 17B is a side view that shows the corner plate and a section of a duct section bent at an area by an adjacent screw in order to bring the flanges into sealed contact.

FIG. 18 is a side view of a spaced apart, aligned relationship of duct sections with end connection flanges having inserted corner plates with the large screw and a gasket applied to one of the duct section flanges.

FIG. 19 is an enlarged sectional view showing only the top duct section flanges in spaced apart, aligned relation.

FIG. 20 is a fragmentary sectional view of a duct section flange and drill tip screw, showing use of the corner plate hole as a drill guide.

FIG. 20A is a fragmentary sectional view of a duct section flange and a hollow ended drill tip screw, showing use of the corner plate hole as a drill guide.

FIG. 20B is a fragmentary sectional view showing a piloted screw end with a spade drill tip, fully received in the hole of a first inserted corner plate and inserted into the hole of a second inserted corner plate.

FIGS. 23B, 23C, 23E, 23F, 23G, 23H, and 23I show additional various functional shape holes that can act as a guide for a drill bit or self-drilling screw during the drilling process for unpunched duct section flanges.

FIG. 26 is a side view of an inserted corner duct flange connection clamping an alternative cable type bracket.

FIG. 26A is an end view of a serrated washer surface of a screw of the alternative cable type bracket and illustrating a manner of wrapping the cable about the screw.

FIG. 27 is an end view of a duct section assembly and alternative cable hangers.

FIG. 28 is an end view of a duct section assembly and an alternative cable hanging arrangement.

DETAILED DESCRIPTION OF PREFERRED EMBODIMENTS OF THE INVENTION

Figure 10:
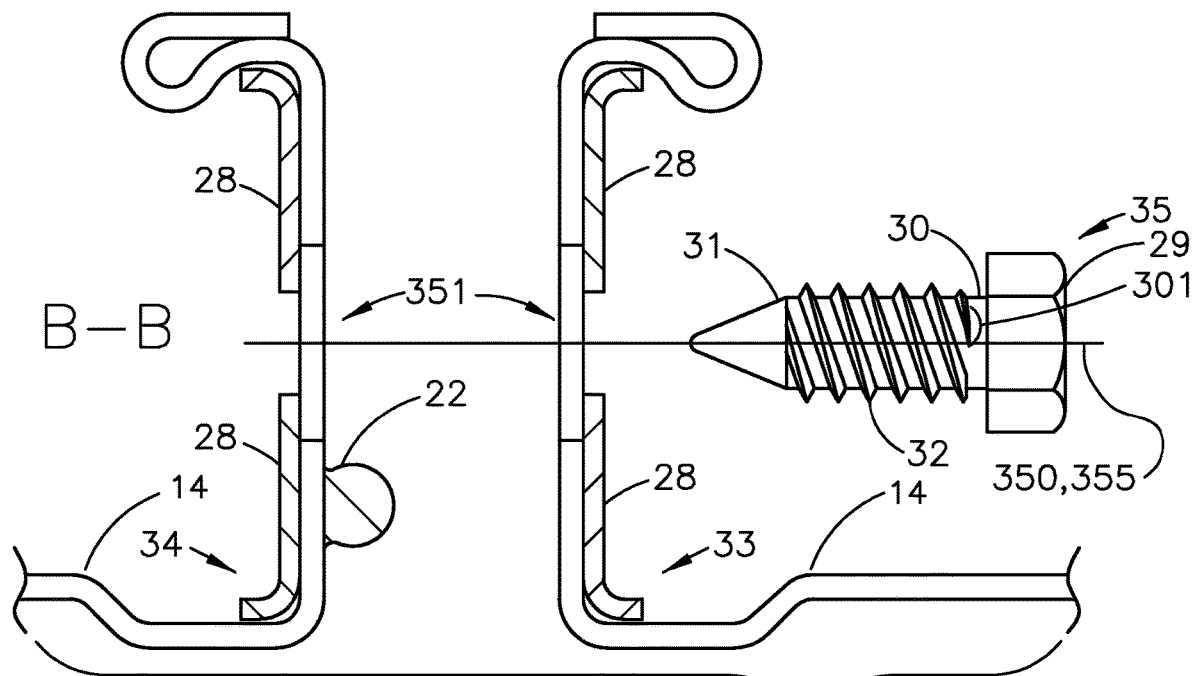
FIG. 10 is a sectional view showing two duct section flanges and a caulking bead on one flange in spaced apart relation with a large piloted sheet metal screw having an unthreaded space adjacent to a head of the screw, the flanges and screw shown in predetermined axial alignment with holes through the inserted corner plates and duct flanges.
Figure 10A:
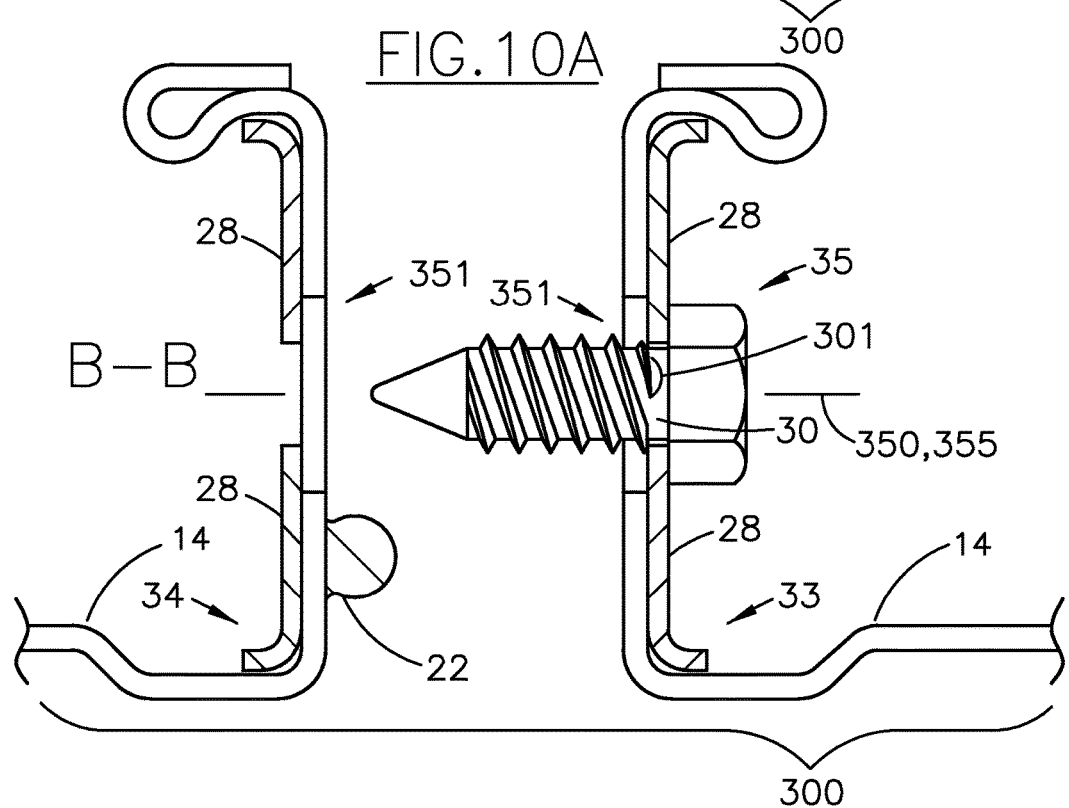
FIG. 10A is another sectional view of the two duct section flanges shown with the large screw fully received in the hole through a first of the corner plates and projecting toward the mating duct flange and corner plate.
Figures 1, 10:
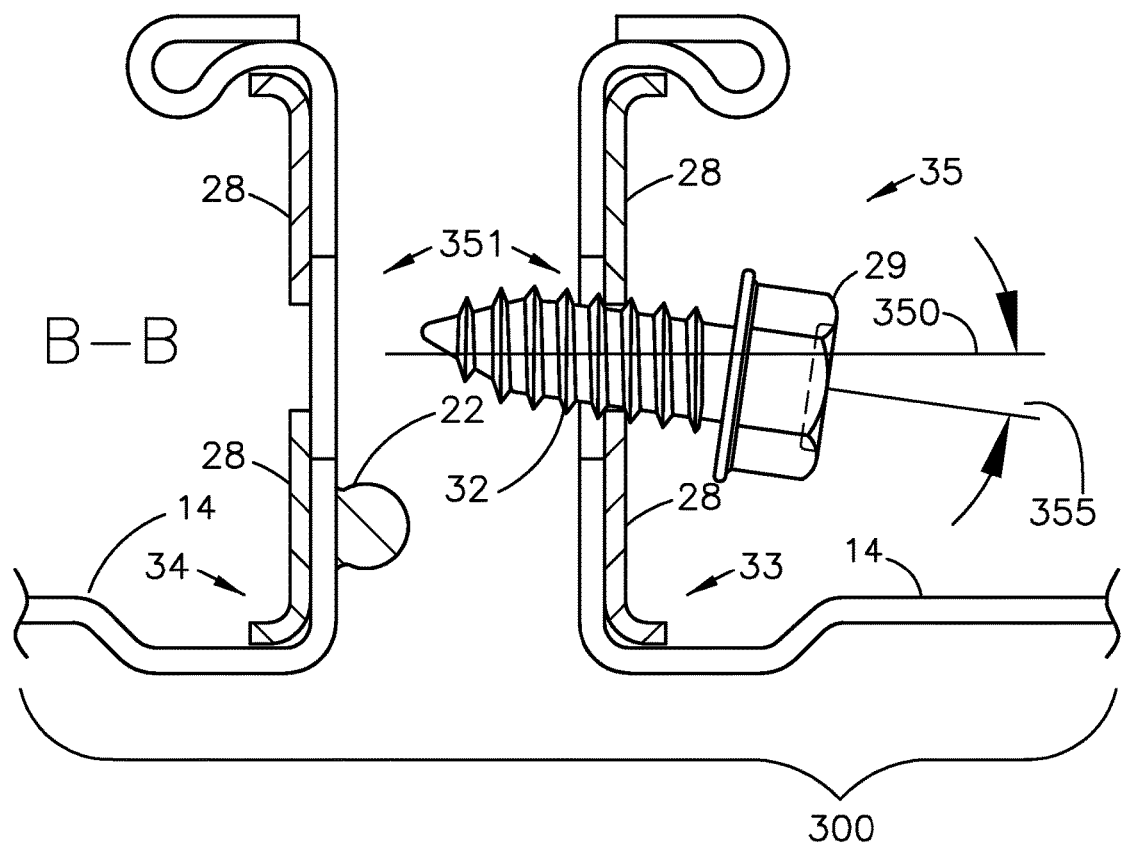
FIG. 1 is a cross sectional view of a prior art flanged duct connection showing a clip in an initial position for connecting mating duct section flanges.
Figures 2, 10:
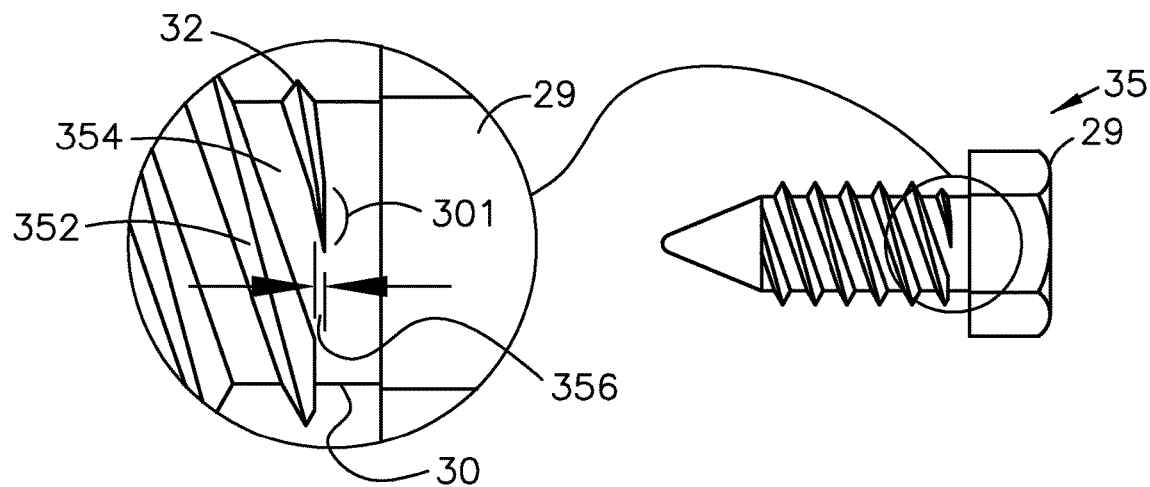

Referring to the drawings wherein like numerals refer to like parts, FIG. 1 illustrates a typical prior art duct flange connection as currently practiced showing a clip 18, a gasket 17 and duct section end flanges 14. FIG. 1A teaches applying the clip 18 by rotating it into position over and around the flanges 14 as illustrated by the arrow. FIG. 1B shows the clip 18 in a final holding position about the flanges 14.

Figure 2:
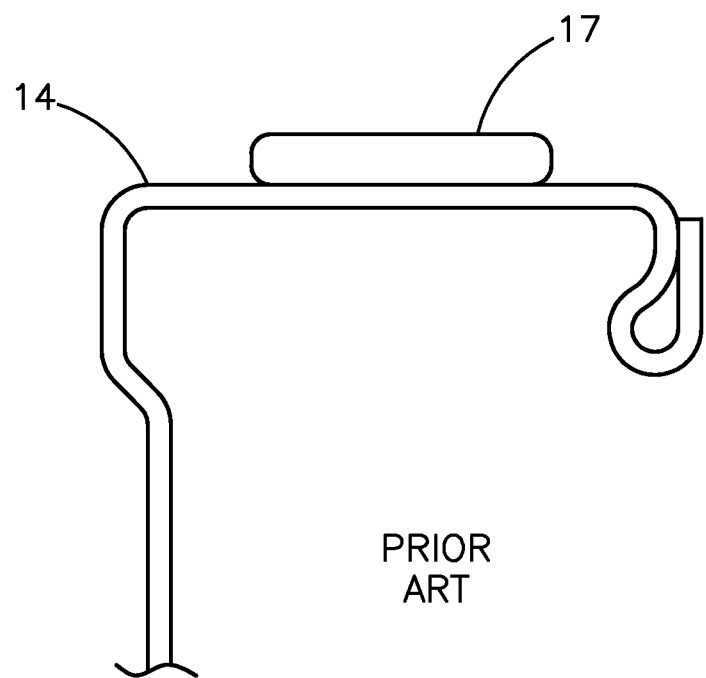
FIG. 2 is an end view of a prior art duct flange showing a prior art adhesive tape gasket adhered thereon.
Figure 3:
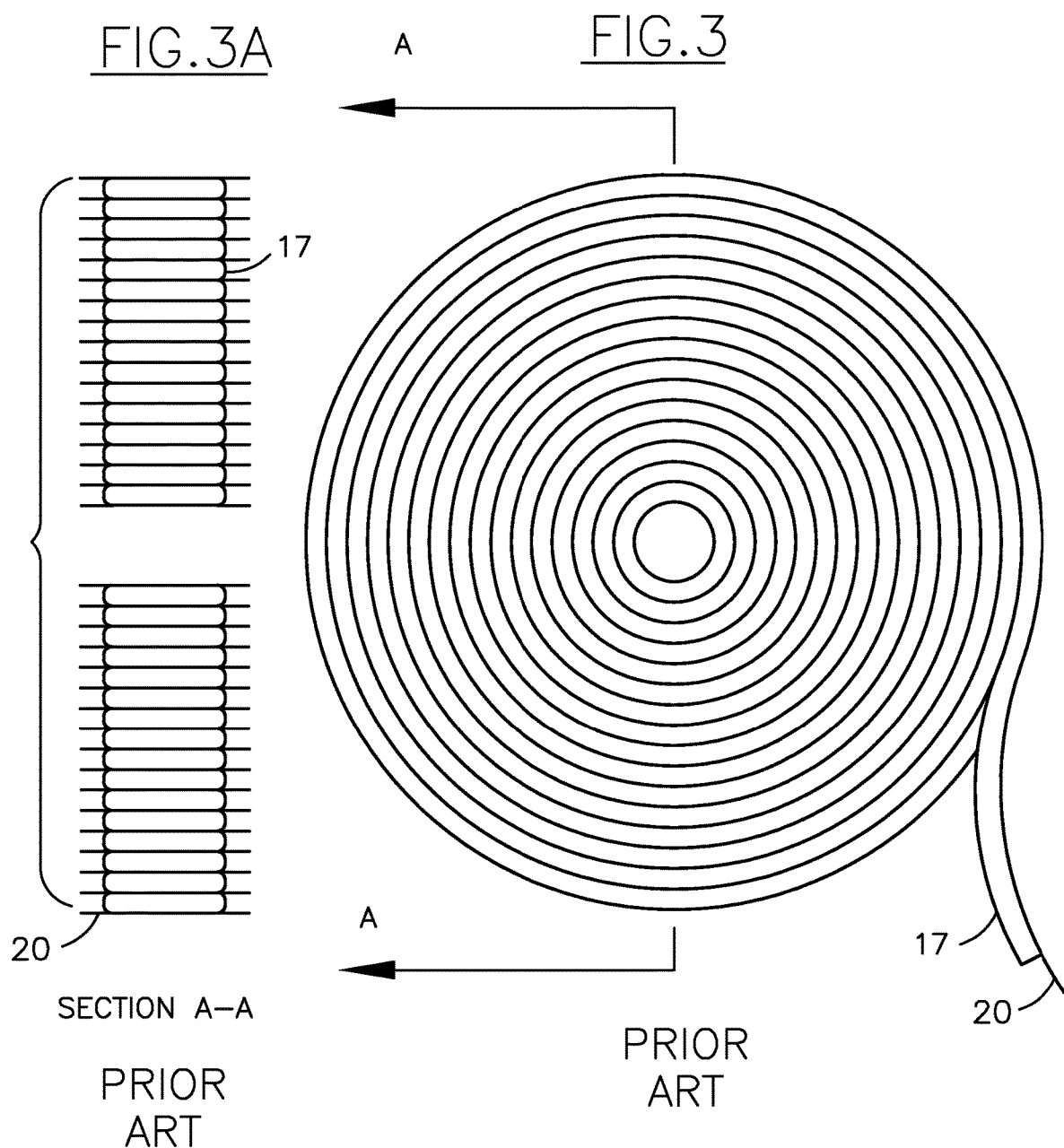
FIG. 3 is a side view of a prior art roll of gasket tape.

FIG. 2 gives the information needed to place the gasket tape 17 properly on the duct section flanges 14. FIG. 3 and FIG. 3A illustrate the typical adhesive tape 17 used for duct joining and shows the non-stick paper backing 20 provided with the tape 17. As the tape 17 is unwound and applied the paper 20 must be crumpled together or otherwise disposed of.

Figure 4:
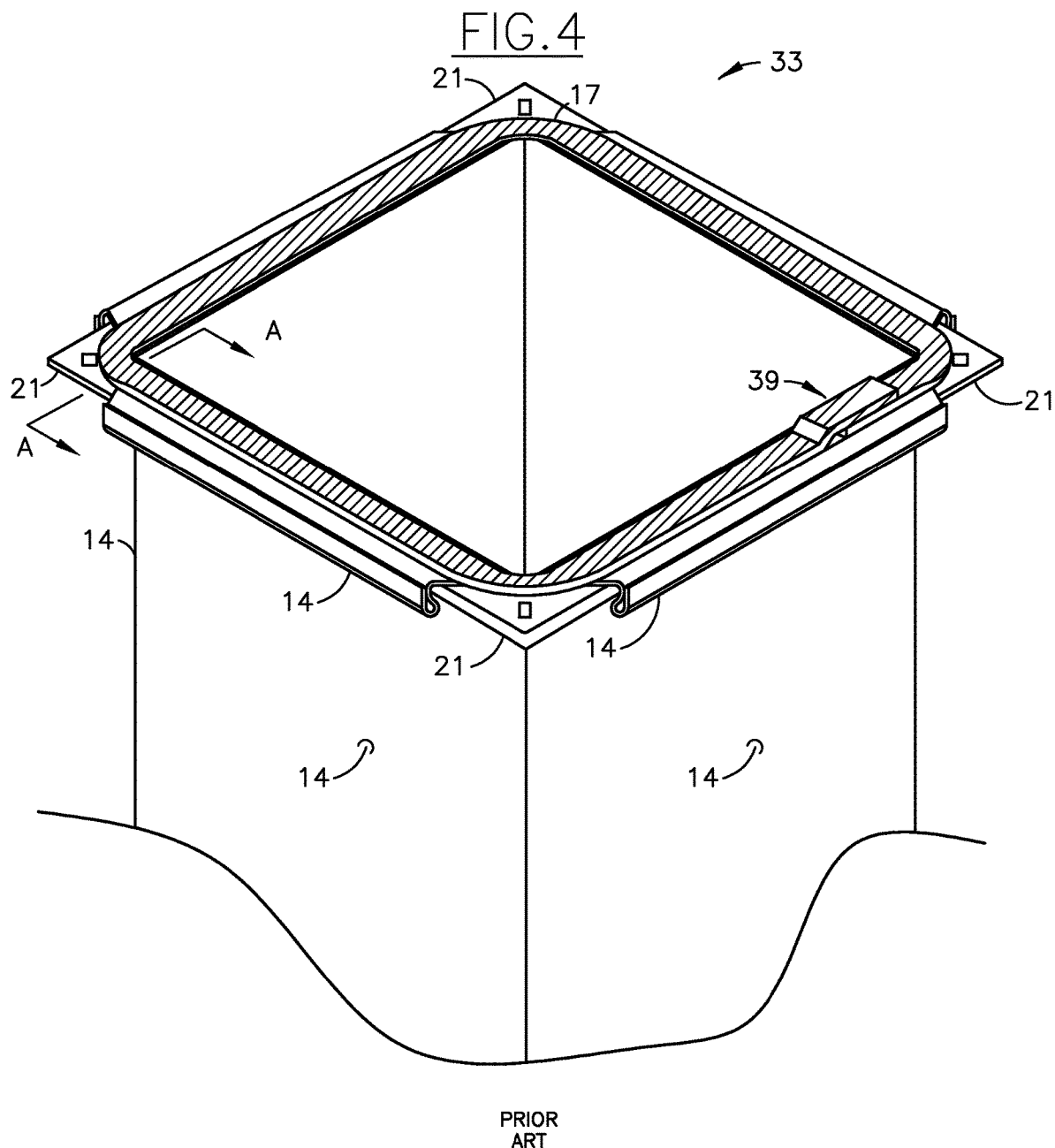
FIG. 4 is a perspective view of a prior art flanged duct section end having generic corner plates in place with adhesive tape gasket applied to the duct section flange and a portion of the inserted corner plate along with an overlap of the adhesive tape gasket.
Figure 5:
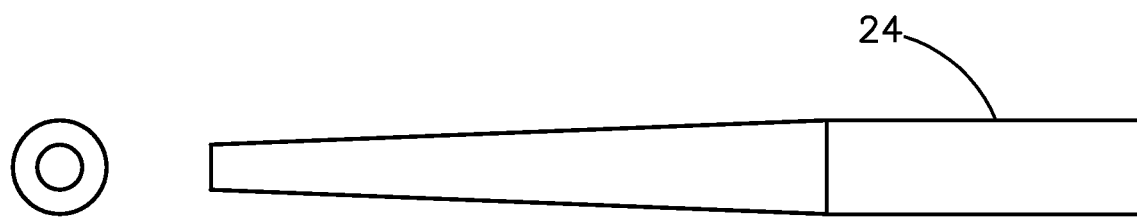
FIG. 5 depicts a common drift pin or tapered punch.
Figure 6B:
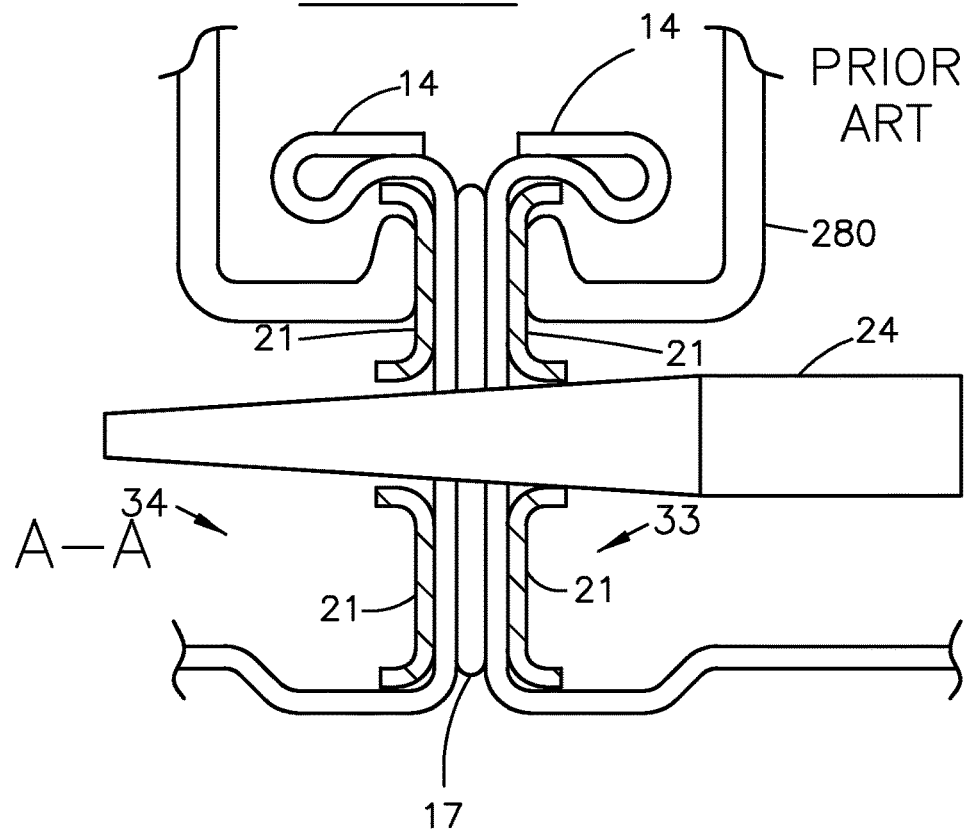
FIG. 6B is another sectional view of the prior art duct section flanges illustrating completed alignment of the flanged duct section ends with a clamp in place.

FIG. 4 shows the tape 17 applied to the end of a duct section flange 14 with a lap 39 where the end of the tape 17 starts and stops. Inserted corner plates 21 are shown in place in the duct section end flange 14. FIG. 5 shows a common drift pin 24 or tapered punch. FIG. 6 shows preparatory alignment of integral duct section flanges 14 or slide on duct section flanges 66 through the use of drift pin 24 through aligned holes through the corner plates 21. FIG. 6A shows the beginning of the insertion process of drift pin 24 into the holes through corner plates 21 of the duct section flange with gasket 17 separate and apart from the mating duct flange 14. It should be understood that if gasket 17 were to inadvertently contact and adhere to the opposing duct flange 14 while flanges 14 are misaligned, it would be difficult and time consuming to remove and correct and often requires disassembly and scraping or peeling of the gasket for removal and replacement with a new gasket and re-alignment. FIG. 6B shows drift pin 24 fully aligned and engaged with corner plates 21 with gasket 17 clamped against the mating duct section flange 14 by clamps 280.

Figure 6C:
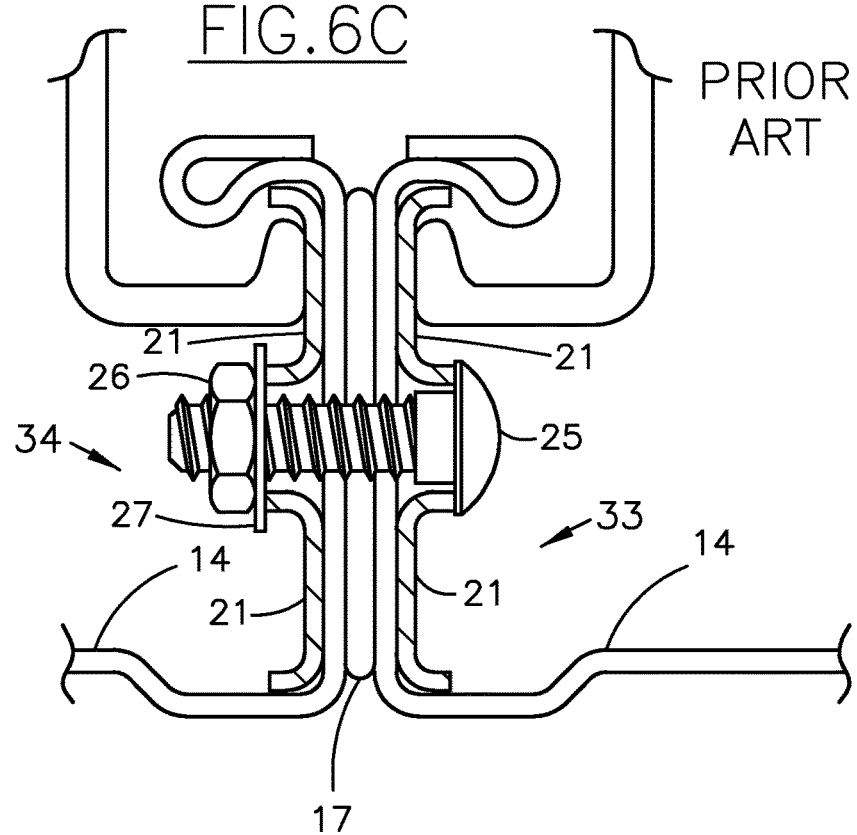
FIG. 6C is another sectional view of the prior art duct section flanges showing the drift pin removed and a carriage bolt, washer and nut in place through the mated duct section flanges and inserted corner plates.

FIG. 6C illustrates after removal of drift pin 24, the insertion of carriage bolt 25 through the holes of the corner plates 21 with washer 27 and nut 26 securely fastened about and through corner plates 21. FIG. 6D shows a completed assembly of the duct section flanges and corner plates 21 with adhesive tape gasket 17 properly adhered and carriage bolt 25 tightened.

Figure 7:
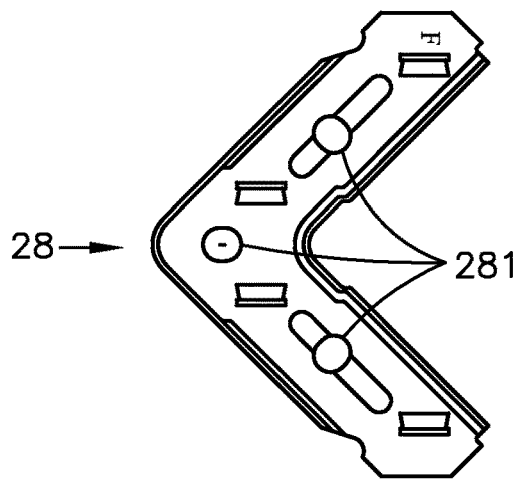
FIGS. 7, 7B, 7D, 7F, and 7H are end views.
Figure 7A:
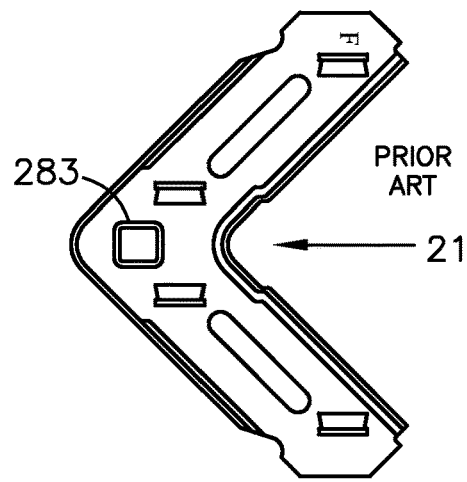
FIGS. 7A, 7C, 7E, 7G, and 7I are end views of representative duct flange corner plates usable with the invention, illustrating various optional shape holes for receiving screws of the invention.
Figure 7B:
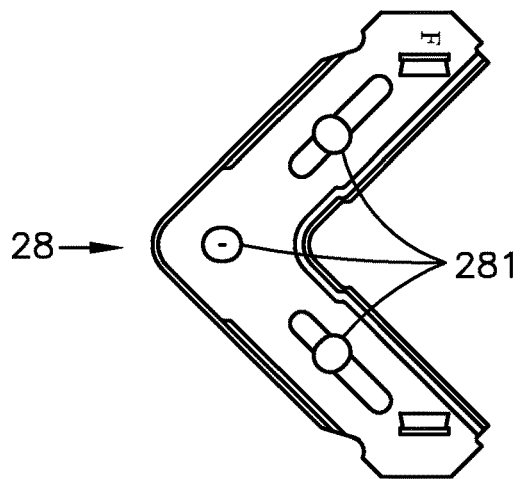
Figure 7C:
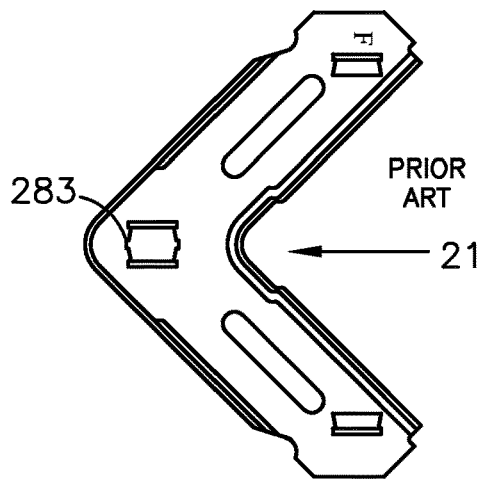
Figure 7D:
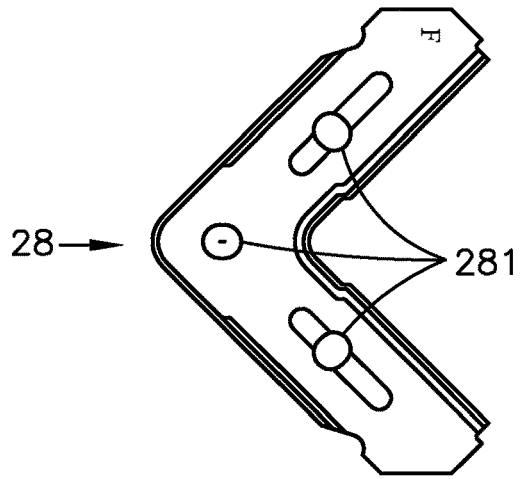
Figure 7E:
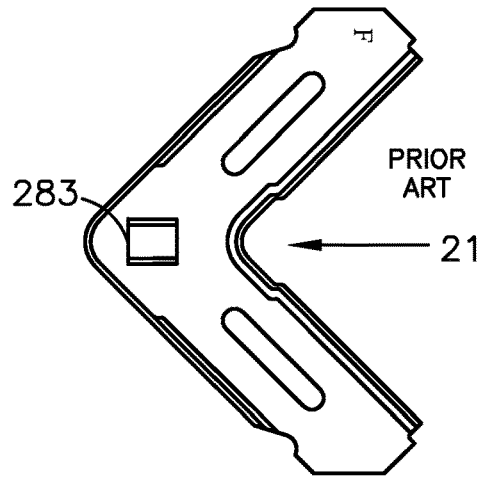
Figure 7F:
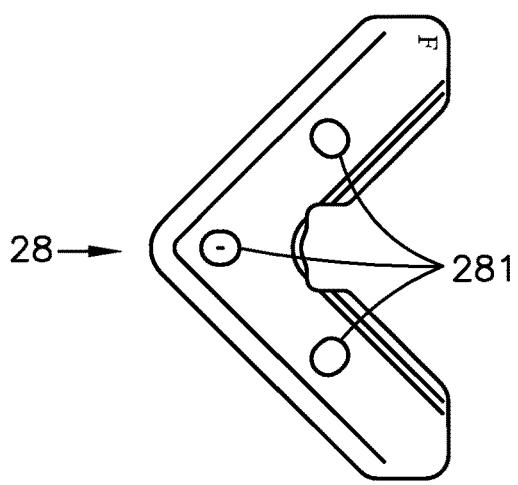
Figure 7G:
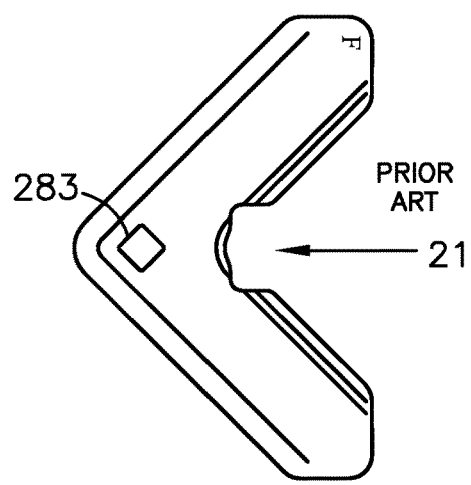
Figure 7H:
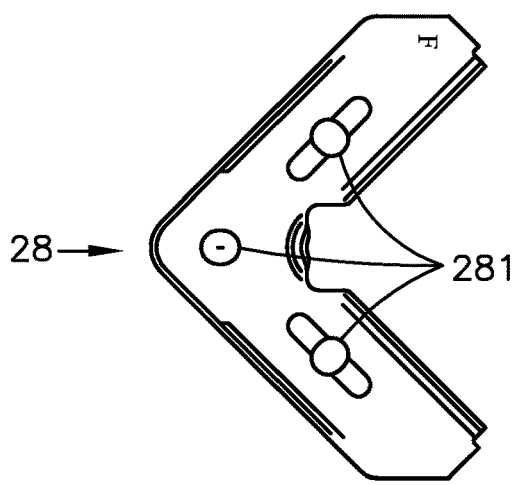
Figure 7I:
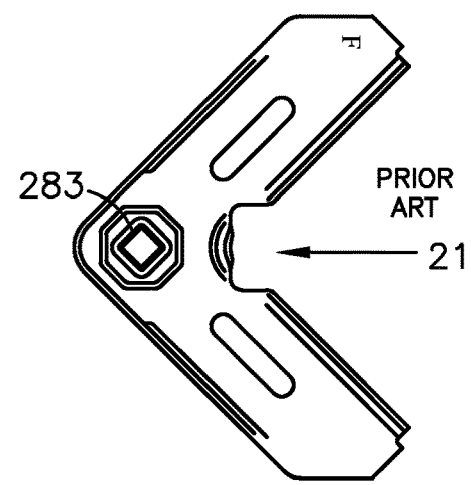
Figure 7J:
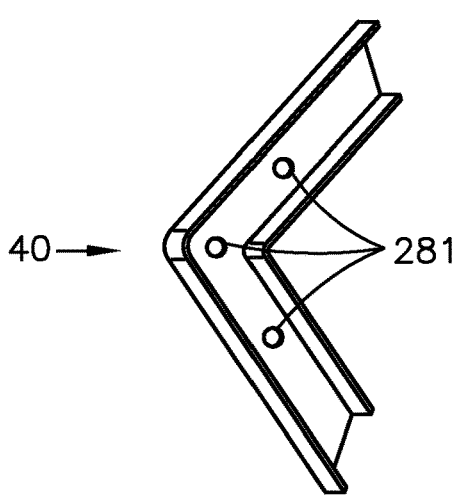
FIG. 7J is a perspective view, of additional representative corner plates usable with the invention, illustrating another optional shape hole for receiving screws of the invention.
Figure 7K:
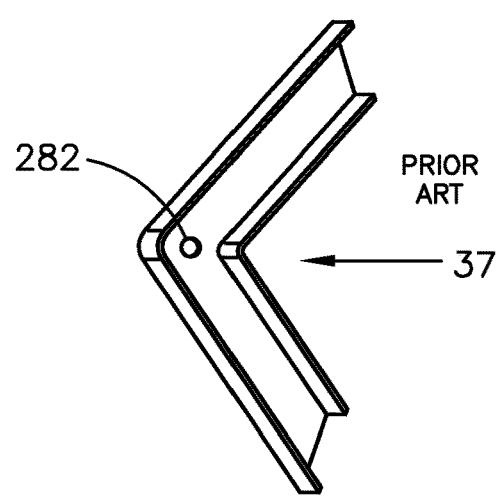
FIG. 7K is a perspective view of a plain generic duct flange corner plate with one opening for receiving a screw of the invention.

FIGS. 7A, 7C, 7E, 7G, and 7I show corner plates 21 of different styles variously including holes 283 therethrough. FIGS. 7, 7B, 7D, 7F, 7H, and 7J show corner plates 28 of those same styles with the addition of holes 281 for use in the system and method of the invention. FIG. 7K shows the addition of corner plate 37 for use with slide on duct section flanges and a single hole 282.

Figure 8:
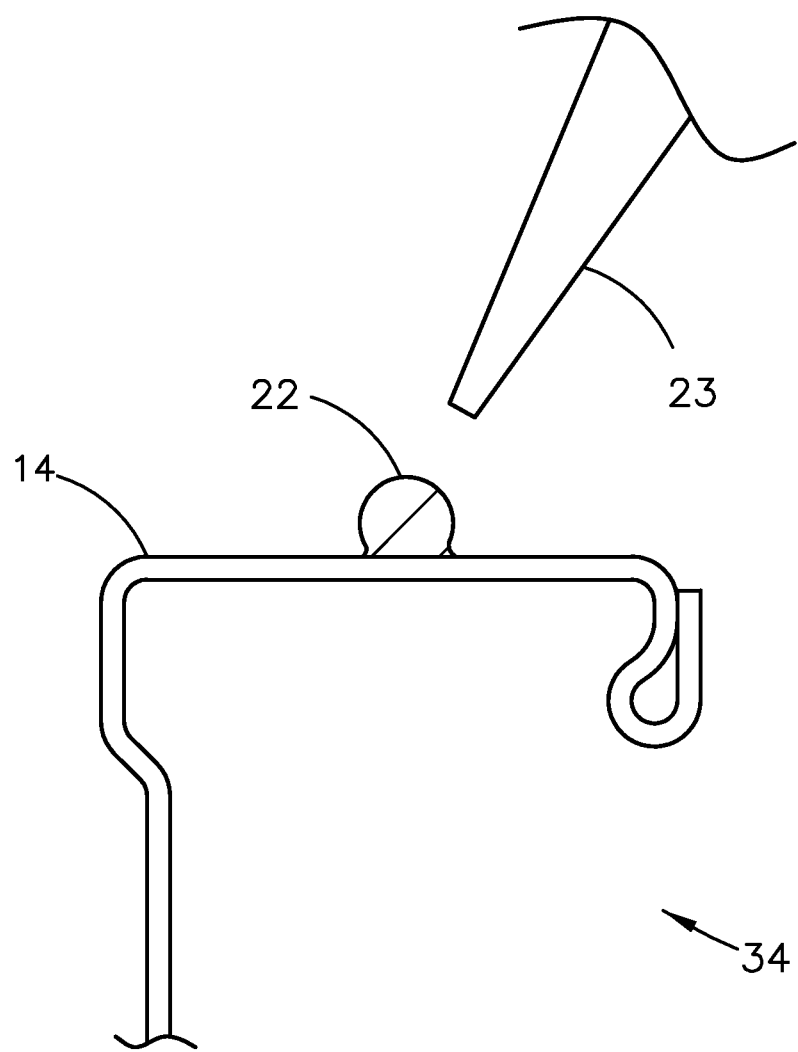
FIG. 8 is an end view of a duct section flange with a bead of semi fluid gasket caulking applied to a surface thereof.
Figure 9:
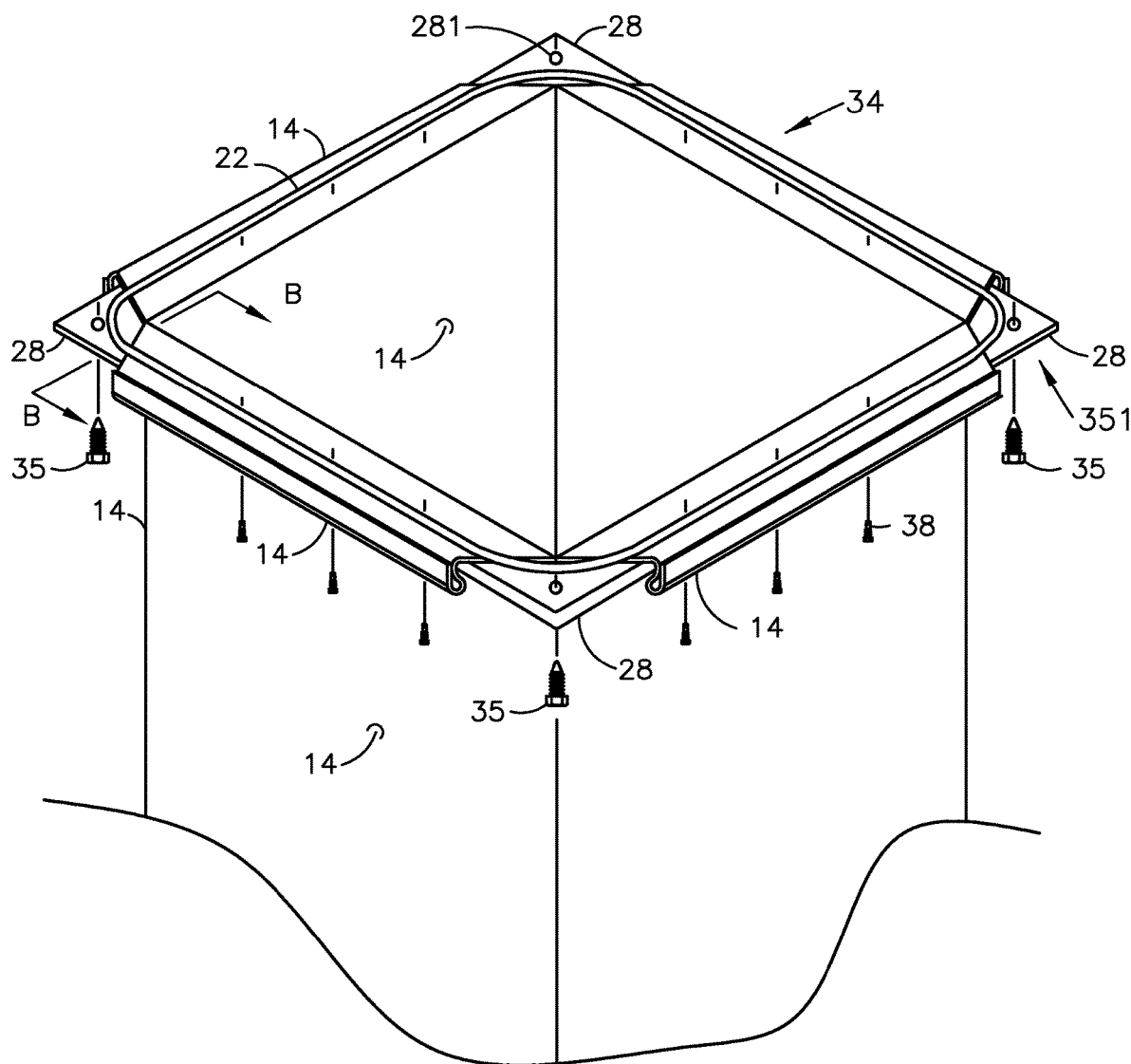
FIG. 9 is a perspective view of an end of a duct section with a bead of gasket caulk on the connection area of the duct section flange, and large sheet metal screws positioned for insertion through openings provided in each of the four inserted corner plates along with self-drilling screws shown at spaced intervals along each duct section flange.

FIG. 8 is a view of a duct section flange 14 with a fluid caulk gasket applied thereto by the use of a hand caulking tube 23. FIG. 9 is a view of a flanged duct section end 34 with inserted corner plates 28 in place with caulk gasket 22 applied on the entire duct section flange 14. Screws 35 of the invention are shown in alignment with holes 281 provided in corner plates 28. Additional screws, which can include, but are not limited to, self-drilling Tek screws represented by screw 38 are shown in spaced relationship along duct section flange channel 14 in centered alignment along each side of the duct section flange end 14 for additionally fastening together duct section flange 14 with a mating duct section flange.

FIGS. 10, 10A, 10-1 show duct flanges 14 of representative duct sections 33 and 34 in a spaced apart aligned state for assembly 300, according to the invention. First and second inserted corner plates 28 are representatively disposed and crimped in place in cavities of flanges 14 in the well known manner. A sealant caulking bead 22 is in place on one of the flanges 14 with a representative screw 35 in coaxial alignment with an alignment axis 350 through holes 351 through inserted corner plates 28 of the flanges 14. FIG. 10A shows the screw 35 fully received in hole 351 of a first of the corner plates 28, with corner plate 28 disposed in an unthreaded space 30 between a head 29 and an endmost thread 301 of a threaded portion 32 of the screw 35 according to the invention. Duct section flanges 14 remain in spaced apart relation.

FIG. 10-1 shows screw 35 tilted with a center axis 355 thereof at a representative approach angle relative to alignment axis 350 through aligned holes 351 of inserted corner plates 28, with screw 35 threadedly engaged with hole 351 of a first inserted corner plate 28. It can be observed that the pitch of threaded portion 32 between adjacent threads is about equal to the thickness of corner plate 28 as measured between opposite surfaces thereof about hole 351, which is desired and advantageous as noted as it enables the threaded engagement without requiring the forced cutting of threads in plate 28 or significant deformation thereof. A preferred angle of tilt will generally correspond to a pitch angle or lead of the threads of threaded portion 32 about the major diameter of the screw, so that the threaded portion 32 of screw 35 can threadedly engage hole 351 of the first corner plate 28 and rotatably pass therethrough with minimum resistance and applied torque, which is advantageous for conserving energy when screw 35 is driven by a battery operated device or by hand.

FIG. 10-2 gives a close up of the space 30 adjacent head 29 of screw 35 showing an extension 356 of the endmost thread 301 of threaded portion 32 extending into a groove 354 between endmost thread 301 and a next adjacent thread 352 of threaded portion 32, as a representative configuration of endmost thread 301 for preventing or obstructing re-engagement of threaded portion 32 of screw 35 with hole 351 of the first corner plate 28, once the screw 35 is fully received in hole 351, as shown in FIG. 10A and subsequently in FIGS. 10B-10E. As can be observed in FIGS. 10A-10E space 30 between endmost thread 301 and the screw head 29 is of a predetermined extent about equal to the thickness of corner plate 28 as measured between opposite surfaces thereof about or adjacent to hole 351, such that when screw 35 is fully received in hole 351, the head 29 and endmost thread 301 will abut plate 28, and cooperate to hold screw 35 in a substantially perpendicular orientation relative to the corner plate, which locates axis 355 through screw 35 substantially coaxial with alignment axis 350 through hole 351 through the first corner plate 28, and also hole 351 through the second corner plate 28 when the corner plates are aligned for assembling the associated duct sections 33, 34.

In the substantially perpendicular orientation shown when screw 35 is fully received in hole 351 of the first corner plate 28, endmost thread 301 is configured to bear or exert a force against the adjacent opposing surface of the corner plate, such that screw 35 will essentially self hold or lock in this position. This bearing force should be sufficiently robust to hold this orientation in opposition to forces and loads anticipated to be exerted laterally and the like, resulting from manipulations and handling of the associated duct sections as they are brought into alignment, e.g., by manual movements. As a result, the screws 35 provide a useful alignment tool.

As a related note, endmost thread 301 and head 29 of screw 35 are configured to transition the screw from the tilted orientation of FIG. 10-1 to the substantially perpendicular alignment orientation of the fully received position shown in the other Figs, e.g., by an automatic action, e.g., a pivoting movement about extension 356, as the screw reaches the fully received position wherein corner plate 35 enters space 30. At this time, threaded portion 32 threadedly disengages from hole 351, but endmost thread 301 is now in abutting contact or engagement with the opposing edge of the corner plate and bears thereagainst in the above described manner. Further in this regard, screw 35 now threadedly disengaged, can rotate in hole 351 relative to the corner plate without moving axially, and the configuration of endmost thread 301, the perpendicular orientation, and lack of a cut thread or deformation of the corner plate for threaded engagement, combine to prevent threaded re-engagement of threaded portion 32 with the corner plate when relatively rotated, including in the direction for re-engagement.

Figure 10B:
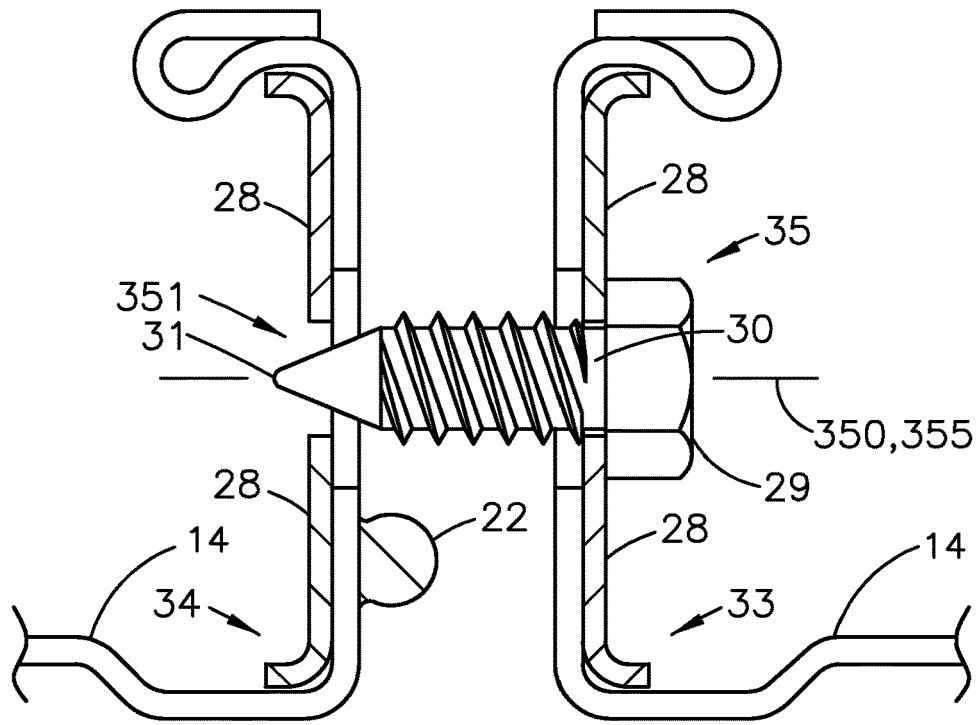
FIG. 10B is a sectional view of the duct section flanges with inserted corner plate of a first of the flanges with the screw fully received in the hole therethrough, positioned in spaced apart aligned relation to the corner plate of a second of the flanges with a tip of the screw inserted into the hole therethrough.
Figure 10C:
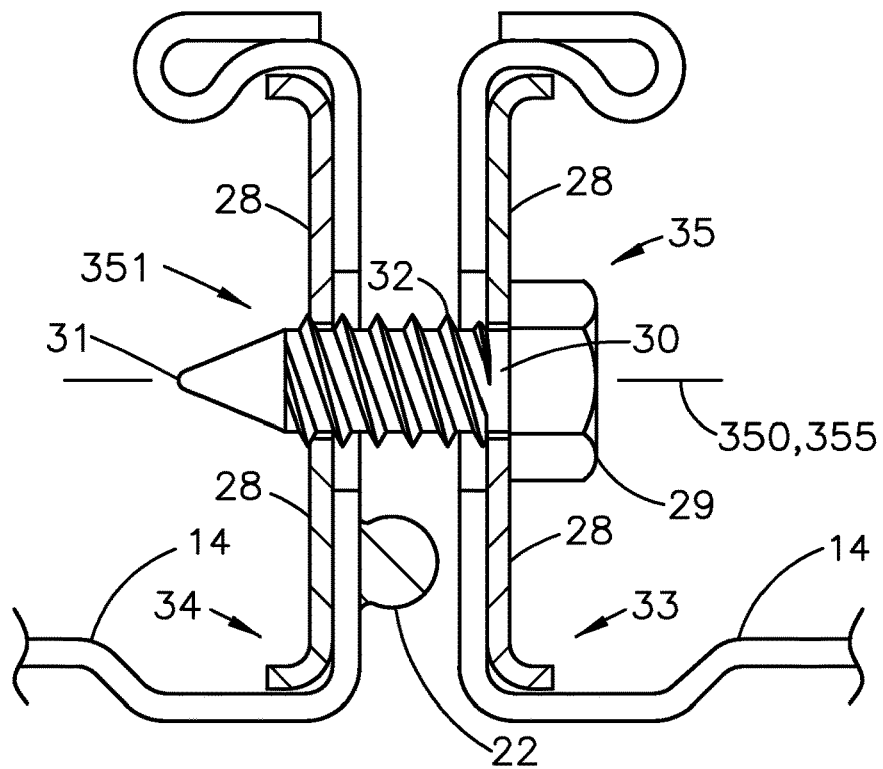
FIG. 10C is another sectional view of the duct section flanges, showing the screw partially threadedly engaged with the hole through the corner plate of the second of the flanges.

FIG. 10B provides a view of screw 35 with a pilot 31 on the tip of screw 35 located in hole 351 of the second corner plate 28 with duct section flanges 14 in aligned and spaced apart relationship with each other with semi-liquid caulk gasket 22 protected from improper engagement with the mating duct section flange 14. FIG. 10C depicts screw 35 in initial engagement with the mating duct section flange 14 with one or more threads of threaded portion 32 threadedly engaged with hole 351 of the mating inserted corner plate 28 while maintaining axial alignment with hole 351. As this occurs, corner plates 28 are held in cavities 33, 34 by the crimped configuration of flanges 14.

Figure 10D:
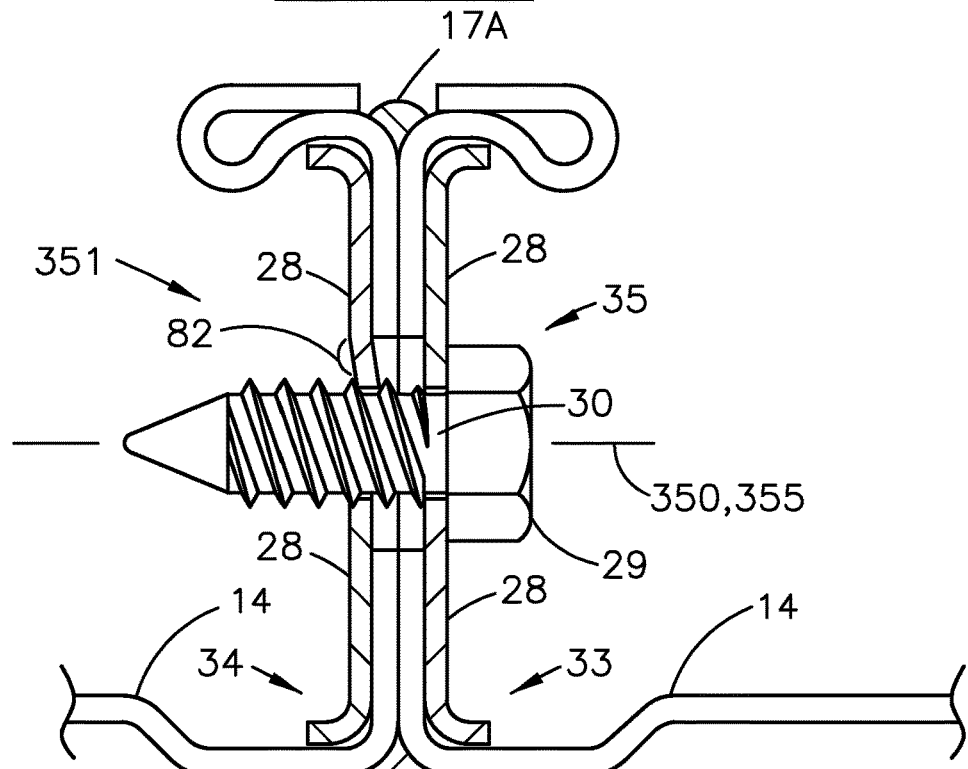
FIG. 10D is another sectional view of the duct section flanges, showing the screw fully threadedly engaged with the hole through the corner plate of the second of the flanges compressing a semi-fluid gasket between the flange to flange connection, illustrating complete assembly of the flanges.
Figure 10E:
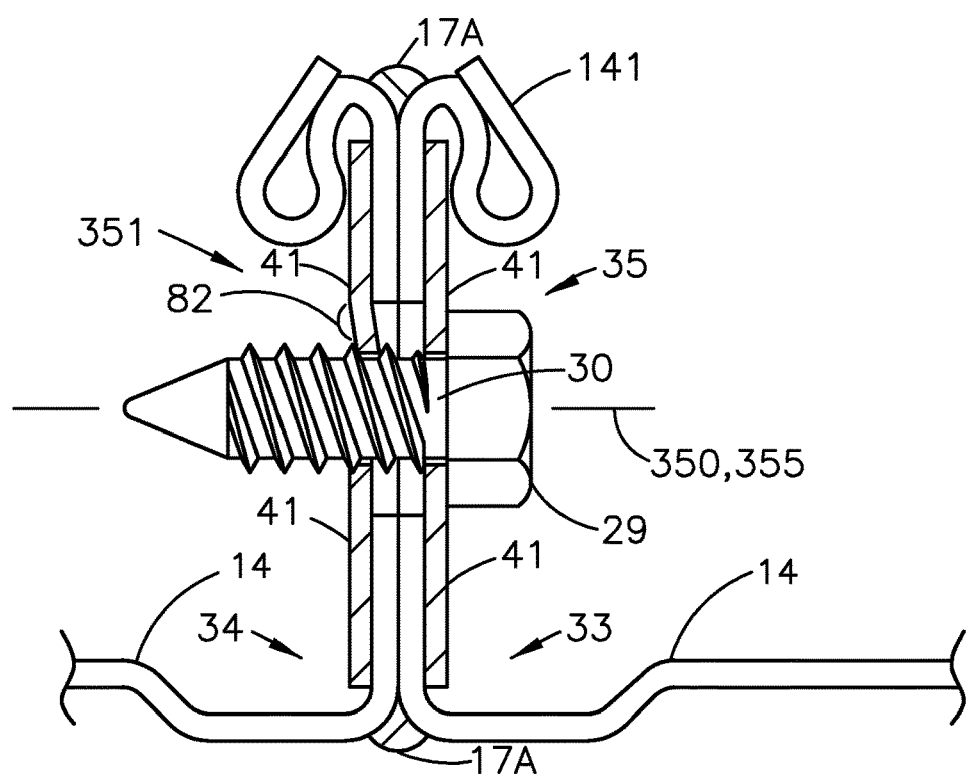
FIG. 10E is a sectional view of alternative duct section flanges and associated flat style inserted corner plates, showing the screw fully received in the hole of the corner plate of a first of the flanges, and fully threadedly engaged with the hole through the corner plate of the second of the flanges compressing a semi-fluid gasket between the flanges, illustrating complete assembly of the flanges.

FIG. 10D shows full threaded engagement of screw 35 with the second corner plate 28, to clamp duct section flanges 14 into full engagement. As screw 35 threadedly engages hole 351 of the second corner plate 28, it will forceably cut a thread therein, or deform the adjacent portion or region of that corner plate as denoted by representative bend 82 to pass through the hole 351, which deformation is accommodated by the large adjacent clearance hole through the associated flange 14. At the same time, the semi-liquid caulk gasket is compressed between the flanges as denoted by protrusion 17A from the joint.

FIG. 10 E shows alternative flat inserted corner plates 41 retained on the flanges of duct sections 33, 34 by crimped flange edges 141 and screw 35 secured in holes 351 through corner plates 41, again creating a bend 82 in the second corner plate 41 as just described.

Figure 10F:
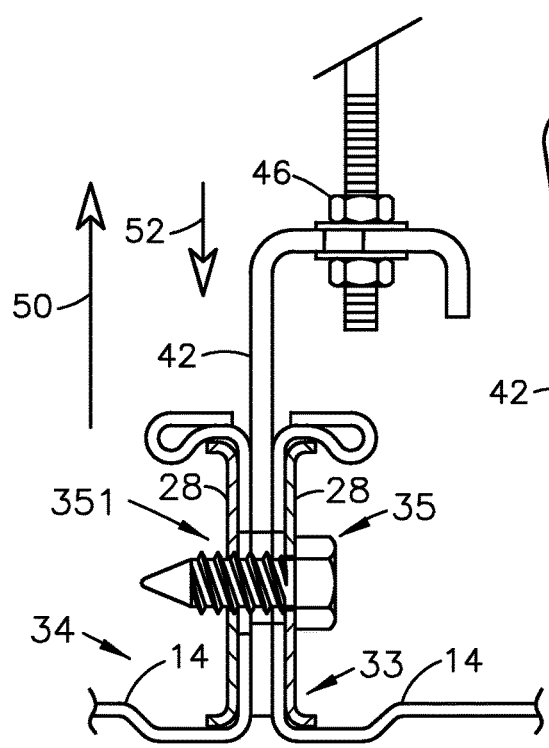
FIG. 10F is a sectional view of assembled duct section flange with the large screw holding a hanger bracket between both flanges with a threaded support rod shown in place and connected to the hanger bracket.
Figure 10G:
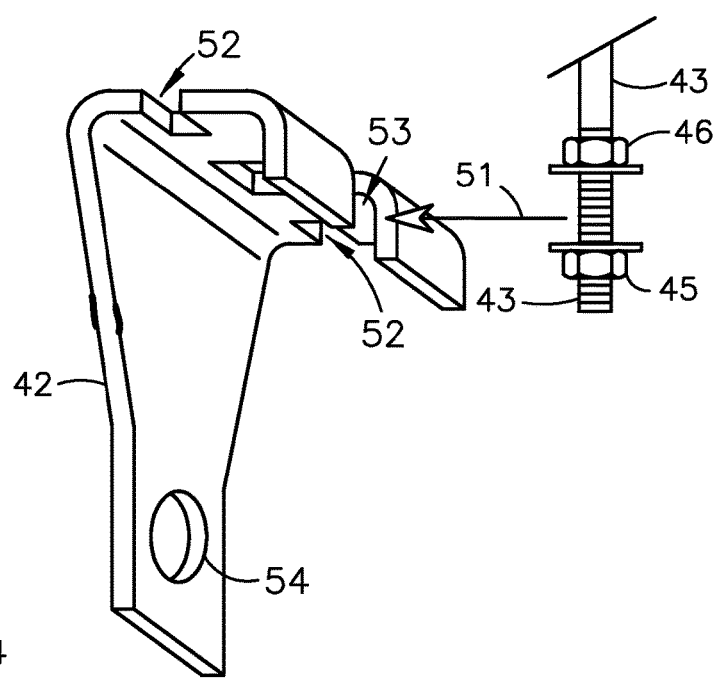
FIG. 10G is a perspective view of the hanger bracket showing illustrating a manner of connection to the support rod.

FIG. 10F shows duct sections 14 incorporating a hanger bracket 42 of the invention fastened between the duct section flanges with screw 35 engaged in the above described manner with corner plates 28 retained on the flanges of duct sections 33, 34 again by crimping. Also referring to FIG. 10G, duct section support threaded rod 43 is shown in position 51 for being readily engaged with lifted duct section assembly position 50 for final positioning in location 52. Nuts 45 and 46 are shown for final positioning and fastening. FIG. 10G is an isometric view of the hanger 42 and is also shown with hanging slots 52 and 53 along with clearance opening 54 for allowance of screw 35 to pass therethrough.

FIG. 10H shows an alternate usage of hanger bracket 42 through the use of cable 47 and cable clamp 48.

FIG. 10I shows screw 35 for fastening the duct section flanges 28 and hanger bracket 42.

FIG. 10K provides and shows yet another alternative to hanging flanged duct sections with cable 47 and clamp 48 through the positioning of cable support hanger bracket 49 fastened between duct section flanges 28 with screw 35.

Figure 10M:
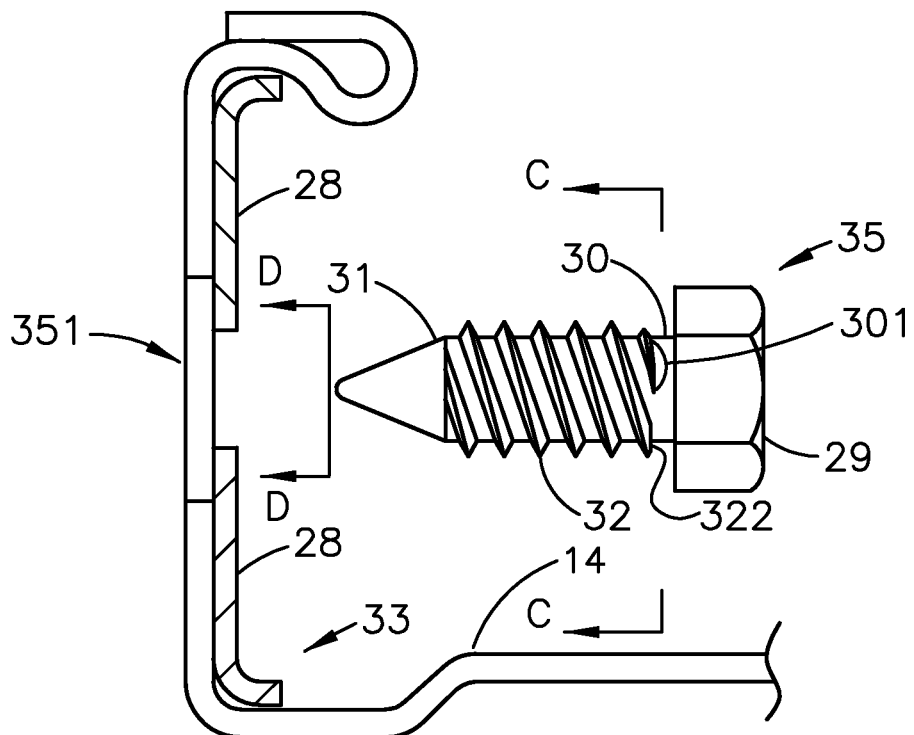
FIG. 10M is a side view of the screw in aligned relation to a duct section flange and inserted corner plate.
Figures 1, 10M:
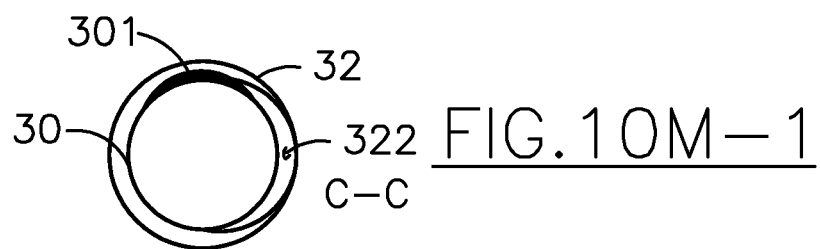
Figures 2, 10M:
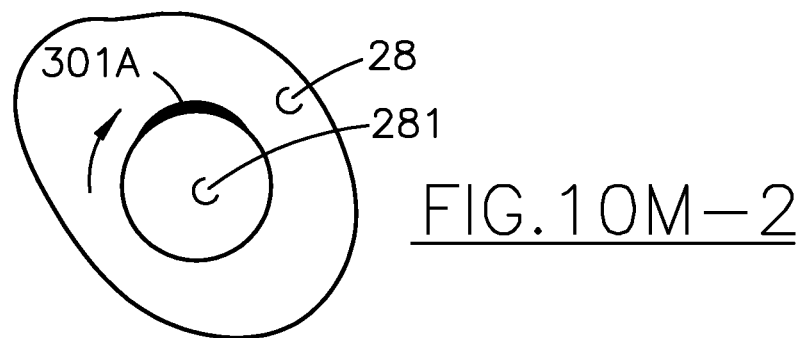

FIG. 10M gives a view of a duct flange 14 having an inserted corner plate 28 with screw 35 in spaced apart axial alignment with section views CC and DD shown in place. FIG. 10M-1 is sectional view CC showing the endmost thread 301 of the threaded portion 32 along with the side 322 of threaded portion 32. FIG. 10M-2 is section DD showing opening 281 in corner plate 28 with locking interference area 301A created by endmost thread 301.

Figure 11:
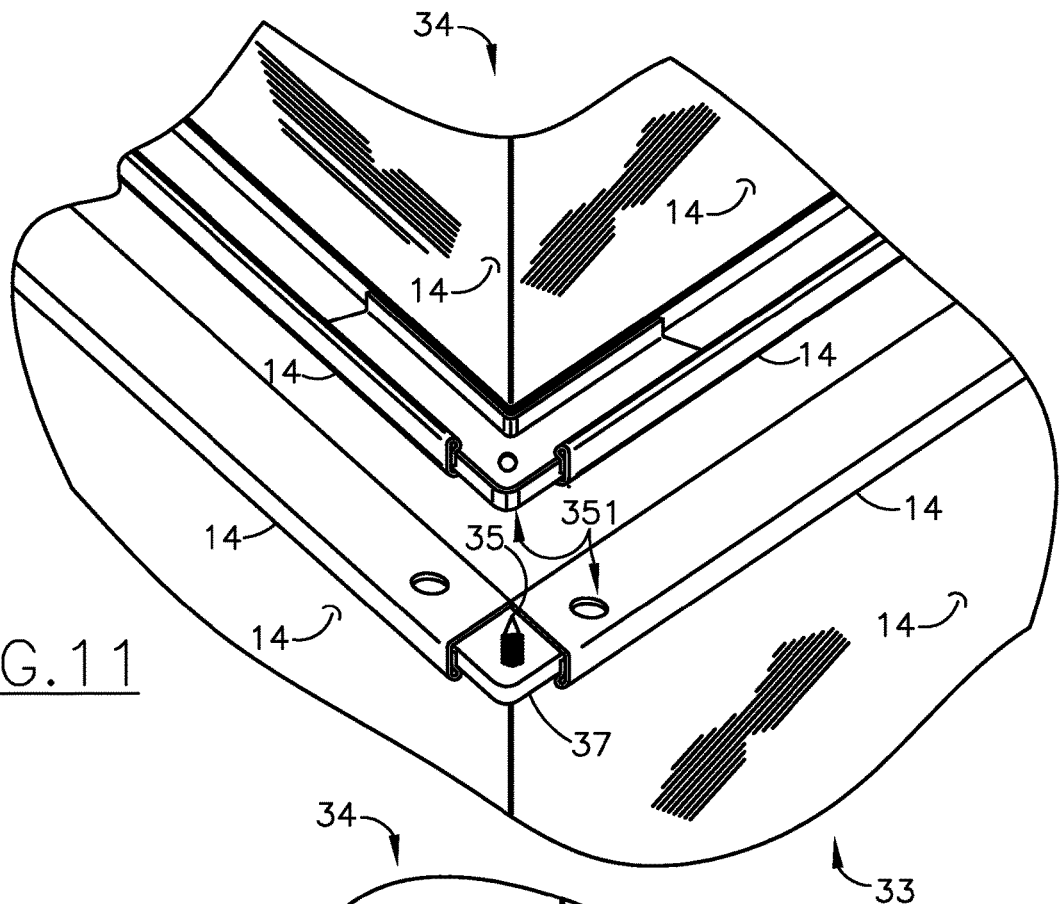
FIG. 11 is a fragmentary perspective view of mating duct section end corners with inserted corner plates of two flanged duct sections, positioned for assembly and showing a single screw through the hole through one of the inserted corner plates.

FIG. 11 shows a partial view of aligned flanged duct sections 33, 34 with corner plate 37 shown with only one screw 35 in position for fastening to the mating duct section flange assembly 34 according to the invention, where the duct assembly will only use one screw 35 in each inserted corner plate 37 for fastening flanged duct sections 33, 34 without hanger brackets 42, 49. Slide on duct section flanges are also anticipated for use with this method of attaching duct sections together.

Figure 11A:
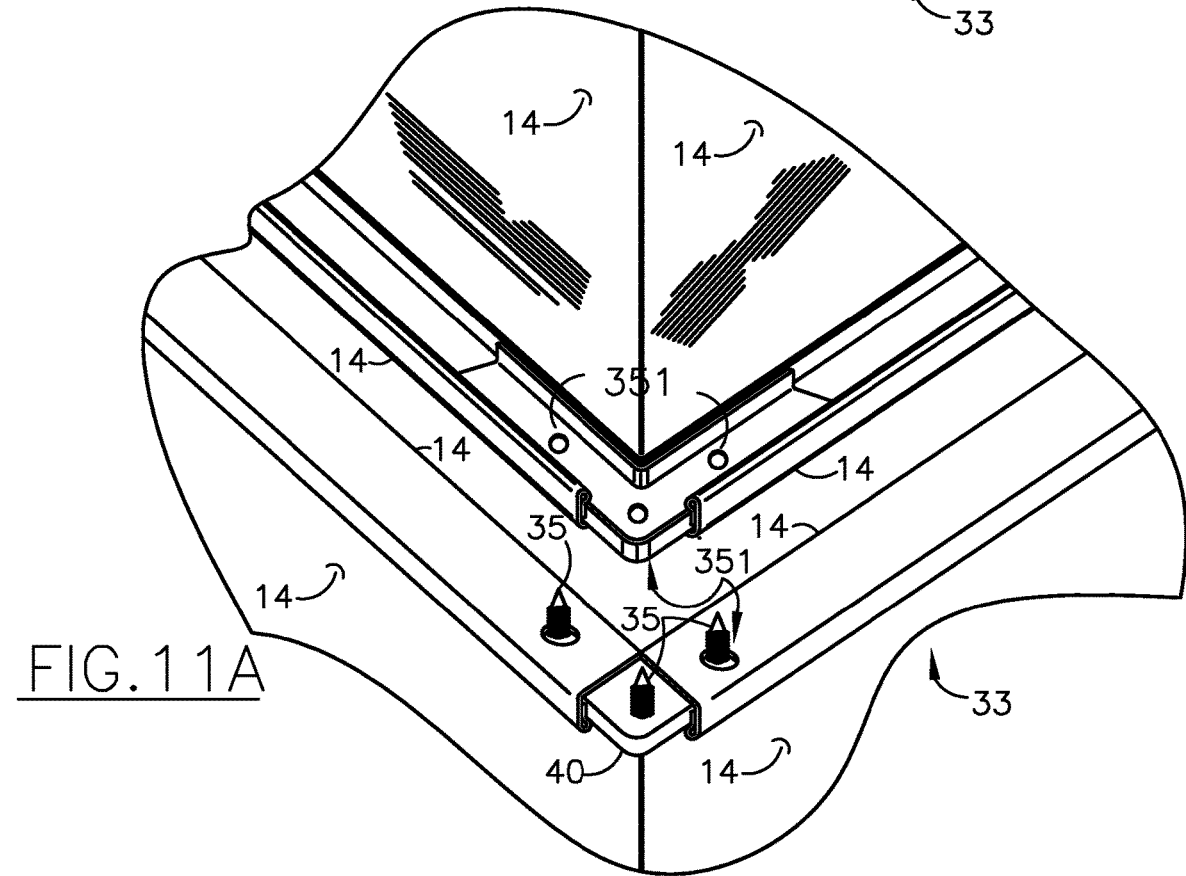
FIG. 11A is another fragmentary perspective view of the mating duct section end corners with inserted corner plates of two flanged duct sections, showing three screws through holes of one of the inserted corner plates.

FIG. 11A provides a partial view of aligned duct sections 33, 34 shown with three screws 35 in place to show an embodiment for use on large duct sections and for use with duct hanger brackets 42, 49. Corner plate 40 is shown with holes 351 for use with corner plate 40, 28, 37 having bent edges for retention in duct the flanges of duct sections 33, 34.

FIG. 12 identifies area 55 with corner plates 28, 37 for use with one screw 35 and area 56 with corner plates 28, 40 for use with three screws 35 according to the invention. The duct section flanges also have openings 39 or dimples spacedly placed along the center of duct section flange 14 for positioning self drilling Tek screws 38 or other screws.

FIGS. 13, 13A, and 13B are views of prior art slide on duct section flanges 57, using corner plates 58, 97 in a similar manner to integral duct section flanges 14 with inserted corner plates 37. Both systems use carriage bolt fastener 25 with a washer 27 and a nut 26 to connect duct sections.

Figure 14:
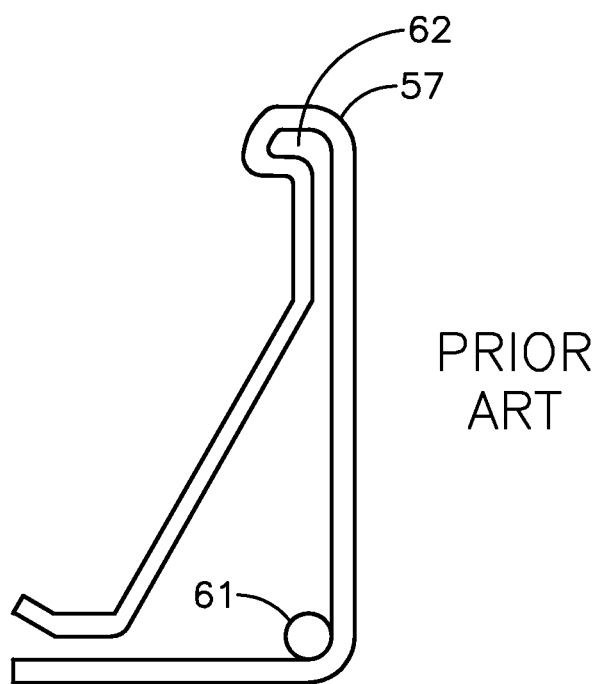
FIG. 14 is an end view of a prior art slide on flange separately located with semi fluid sealant caulk gasket material in location for sealing duct sections at the ends.

FIG. 14 is a drawing of a prior art slide on duct section flange 57 with space 62 for accepting the corner plate 37.

FIGS. 15, 15A, and 15B show the large screw 35 and corner plates 37, 98 in a fully connected relationship of slide on flanges 57 being connected to duct sections 60 through the use of screws 38. Caulk gaskets 17A and 61A provide sealed relationship of the assembly at the ends of duct sections 60.

FIG. 16 shows corner plate retention improvement 141 as a crimp or bend in the outer edge of duct section flange 14. FIG. 16A provides a duct section hanger bracket 423 of a simplified style.

FIGS. 17 and 17A show a spaced apart relationship of mating duct sections 33, 34 resulting from hanger bracket placement therebetween creating space 1. Pilot cone area 451 is shown in a final fastened position in the outermost corner plate hole. FIG. 17B shows the corner plate 28 and a section of duct section 14 bent at an area 2 by adjacent screw 35 in order to bring duct section flanges 33, 34 into sealed contact 1A.

FIG. 18 is a view of duct end sections 33, 34 spaced apart by space 1 and in aligned relationship with gasket 22 in place for final sealing during fastening duct section flanges 14 together in sealed relationship. FIG. 19 provides an enlarged view of two duct section flanges 14 in aligned and spaced apart by space 1, with gasket 22 attached to one flange for fastening and sealing through the use of screw 35 without the need for drift pin 24 alignment and clamp 28.

FIGS. 20, 20A show duct section flange 14 with inserted corner plates 28 being used to guide drill screws 31F, 31G for drilling, spacing and fastening duct sections 33 together in mating connection.

Figure 20C:
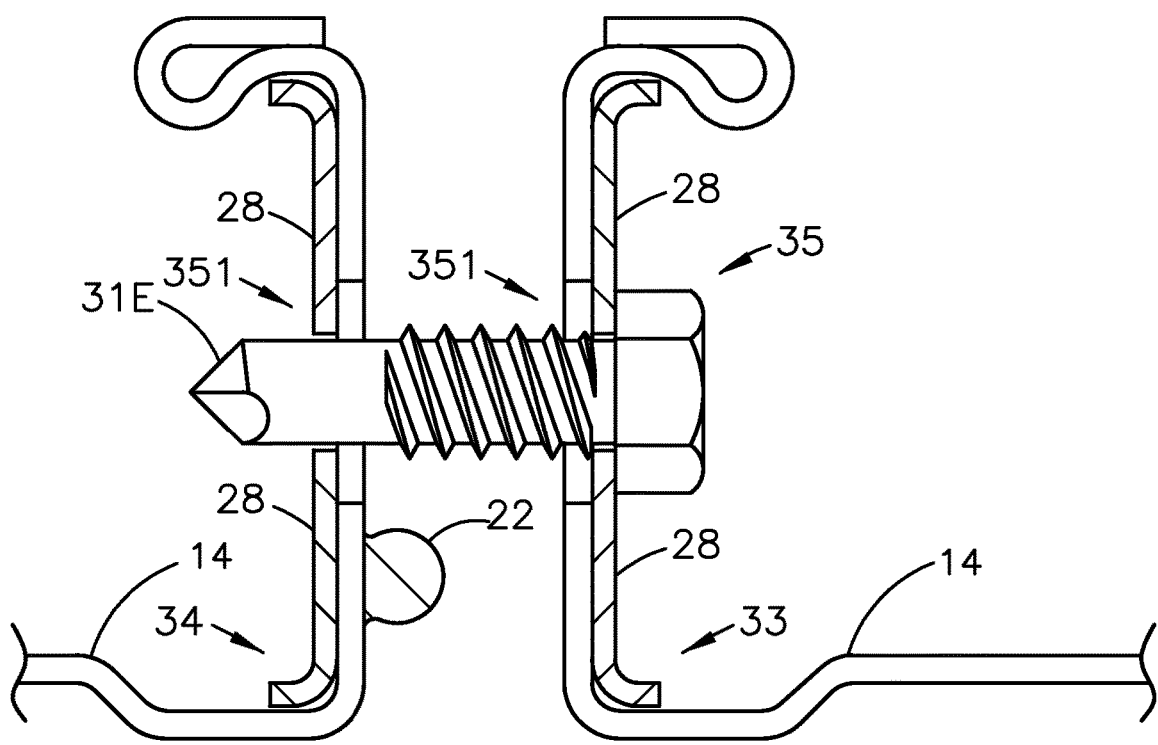
FIG. 20C is a fragmentary sectional view showing a piloted screw end with a cylindrical drill tip, fully received in the hole of a first inserted corner plate and inserted into the hole of a second inserted corner plate.

FIGS. 20B, 20C show alternate drill screw styles 31D and 31E.

Figure 21:
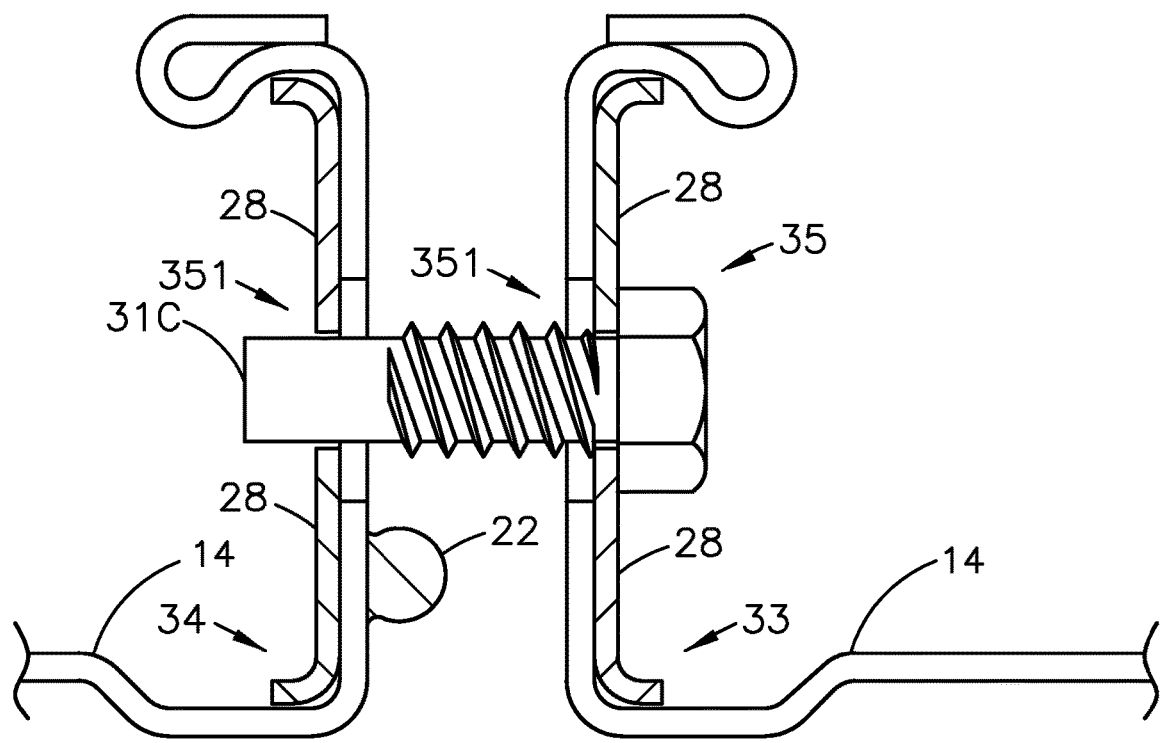
FIG. 21 is a fragmentary sectional view showing a cylindrical pilot tip screw, fully received in the hole of a first inserted corner plate and inserted into the hole of a second inserted corner plate.
Figure 21A:
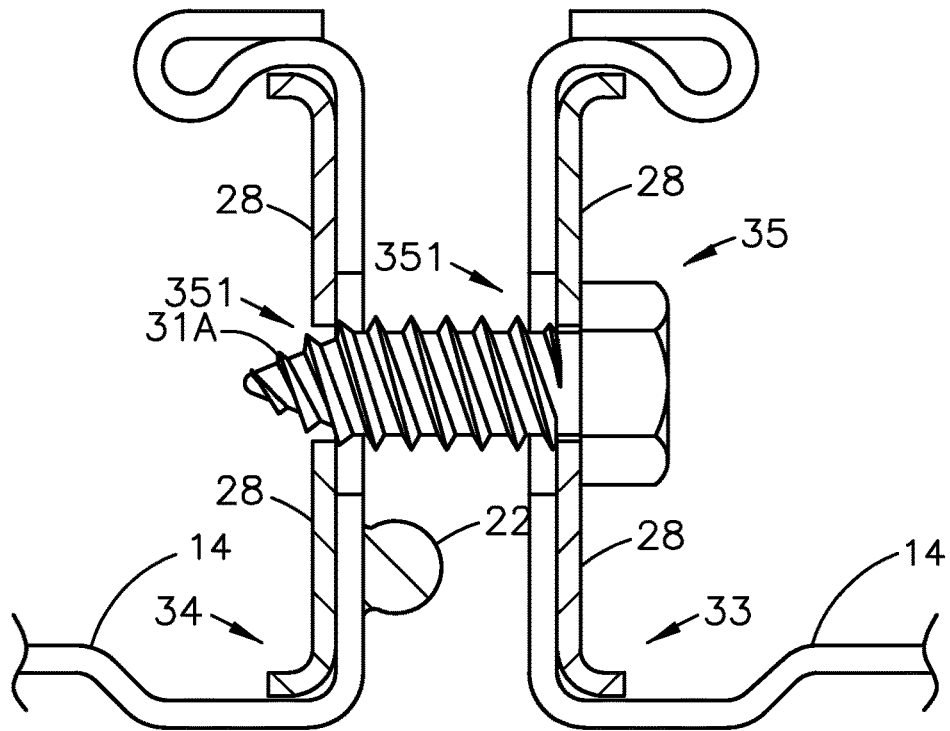
FIG. 21A is a fragmentary sectional view showing a threaded tapered pilot tip screw, fully received in the hole of a first inserted corner plate and inserted into the hole of a second inserted corner plate.
Figure 21B:
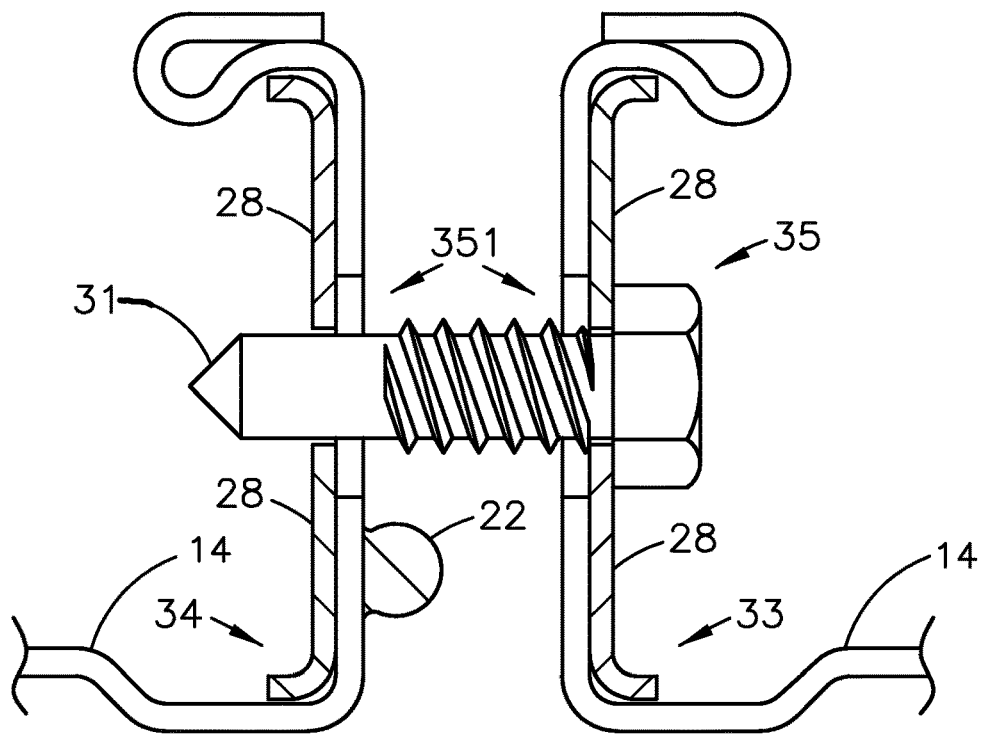
FIG. 21B is a fragmentary sectional view showing a conical pilot tip screw, fully received in the hole of a first inserted corner plate and inserted into the hole of a second inserted corner plate.
Figure 22:
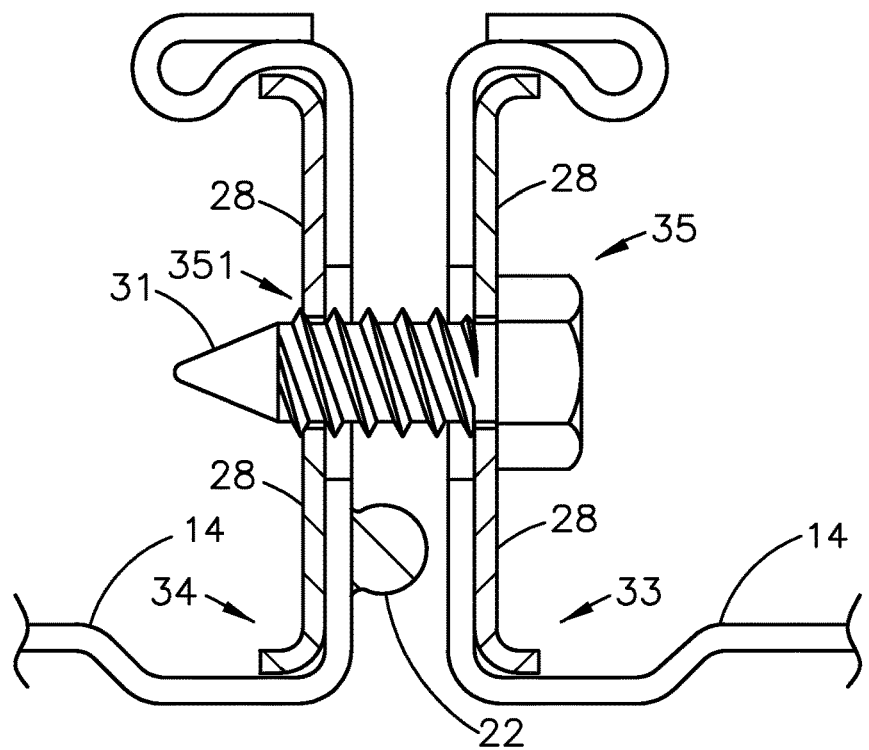
FIG. 22 is a fragmentary sectional view showing another conical pilot tip screw, fully received in the hole of a first inserted corner plate and inserted into the hole of a second inserted corner plate.
Figure 22A:
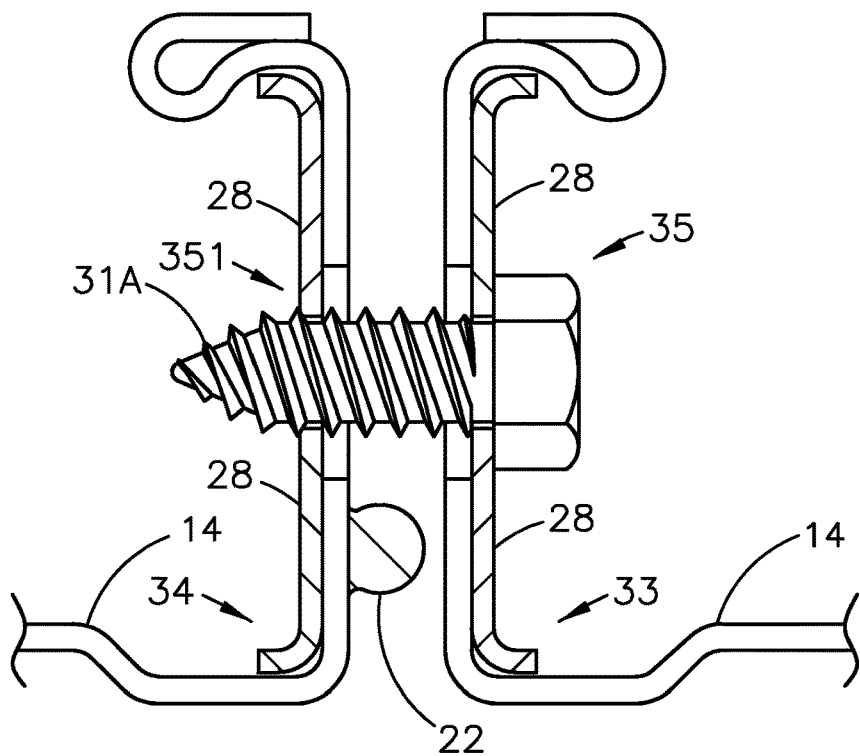
FIG. 22A is a fragmentary sectional view showing another threaded tapered pilot tip screw, fully received in the hole of a first inserted corner plate and inserted into the hole of a second inserted corner plate.

FIGS. 21, 22, and 22A show screw 35 with alternate ends 31, 31A and 31C as a threaded cone, cone end, and simple cylinder as alignment pilots. FIG. 22 shows the screw 35 threadedly engaged in corner plates 28 having pilot cone 31 and pilot threaded cone 31A as examples.

Figures 23, 23I, 23J:
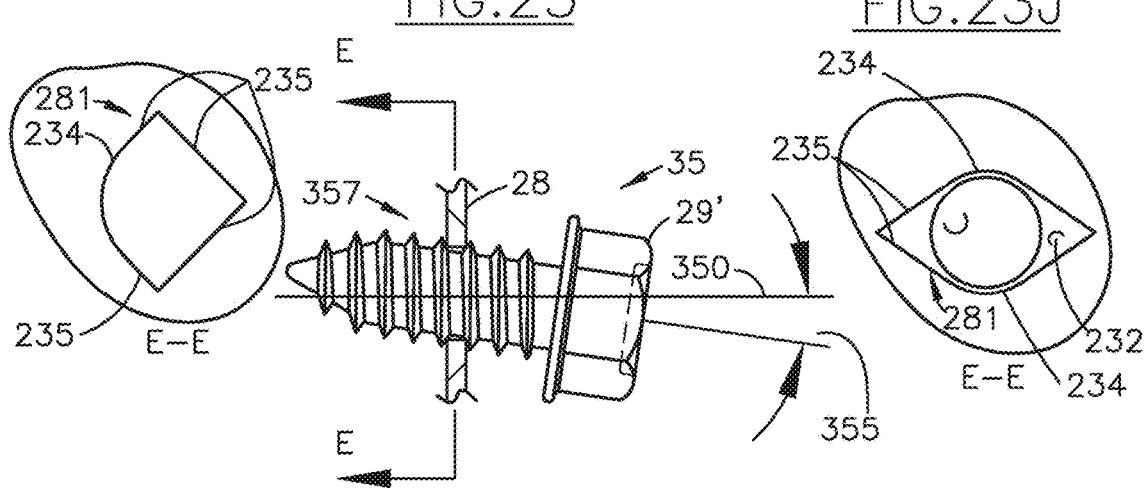
FIG. 23 is a fragmentary sectional view of a preferred embodiment screw in tilted and threaded engagement with a hole through a corner plate.
FIGS. 23B, 23C, 23D, 23E, 23F, 23H, and 23I show various functional shape holes through inserted corner plates that allow threaded engagement with a screw without formed or cut threads in the plate.
FIG. 23J shows use of a self-drilling screw with a corner plate having the hole shape shown in FIG. 23E.
Figure 23A:
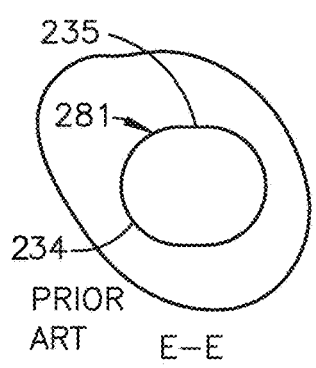
FIG. 23A is an end view showing a representative prior art oval shape hole through a corner plate.
Figure 23B:
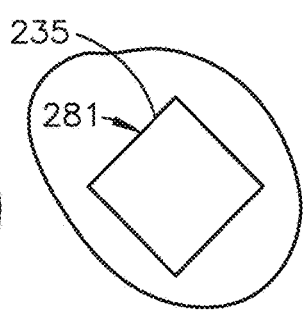
Figure 23C:
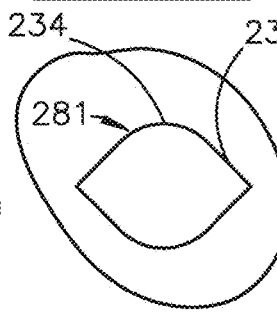
Figure 23D:
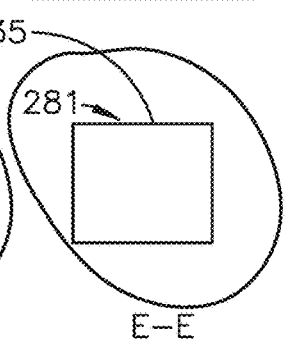
Figure 23E:
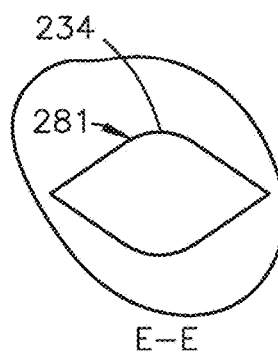
Figure 23F:
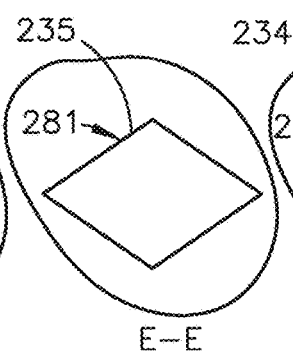
Figure 23G:
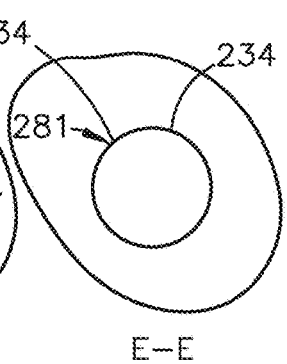
Figure 23H:
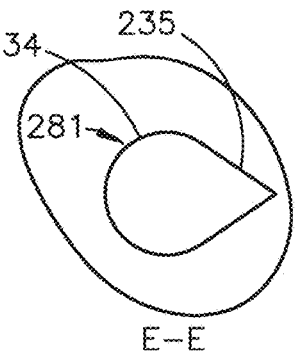

FIG. 23 teaches single thread engagement 357 with one thickness of corner plate 28 with axis 355 of screw 35 tilted relative to the alignment axis 350 for threading therethrough. FIG. 23A shows a prior art hole for threading through corner plates, FIGS. 23B,C,D,E,F,G,H and FIG. 23I show alternative hole shapes for threading the screw through the corner plate without cutting threads. FIGS. 23B,E,C,F and FIG. 23G are preferred embodiments since they provide guiding when using a drill bit or self-drilling screw as shown in FIG. 23J to pass through the integral duct flange if it has no pre-existing opening. The use of hole 281 with combinations of edges 235 and contours 234 for forming hole shapes 232 that accommodate screw 35 for threadably passing there-through without the need to forcibly cut threads. Suitable shape holes can include, but are not limited to, square, obround, rectangle, rhombus, rounded rhombus, partially round in combination with square or rhombus or even trapezoidal through the use of the edges.

Figure 24:
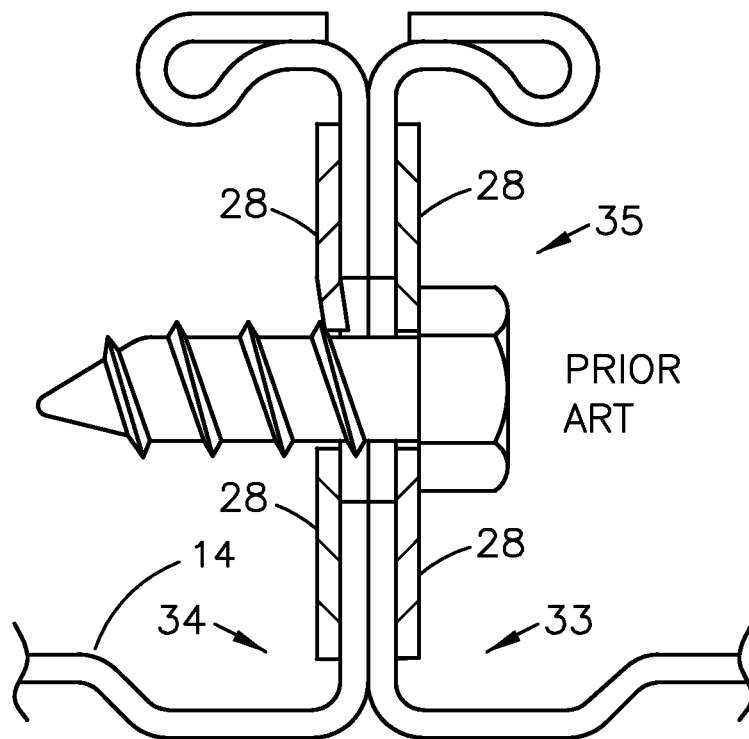
FIG. 24 is a sectional view showing a prior art fastener with thread pitch or spacing between adjacent threads about equal to the thickness of two corner plates, shown fastening together inserted corner plates of two duct sections, assembled.

FIG. 24 shows a prior art fastener having thread spacing about equal to the thickness of two corner plates 28 combined.

Figure 24A:
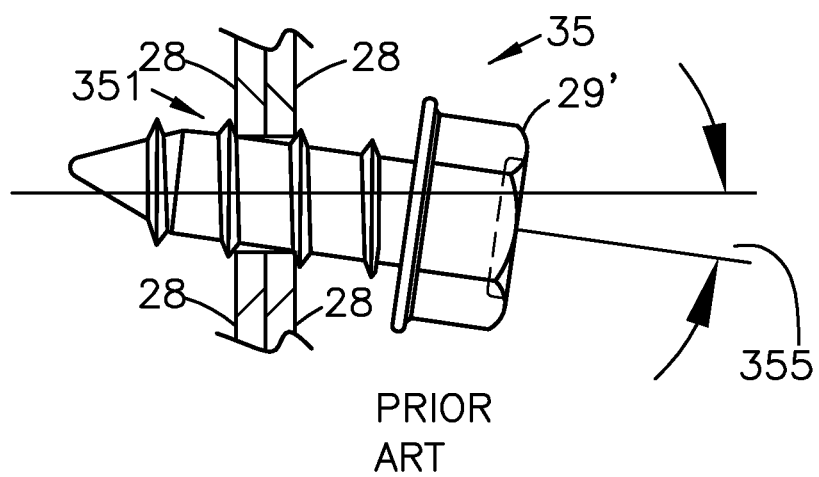
FIG. 24A is a side view of the prior art fastener shown in FIG. 24 in tilted initial threaded engagement with the inserted corner plates.

FIG. 24A shows the prior art screw of FIG. 24 tilted 355 to accommodate two corner plates 28.

Figure 25:
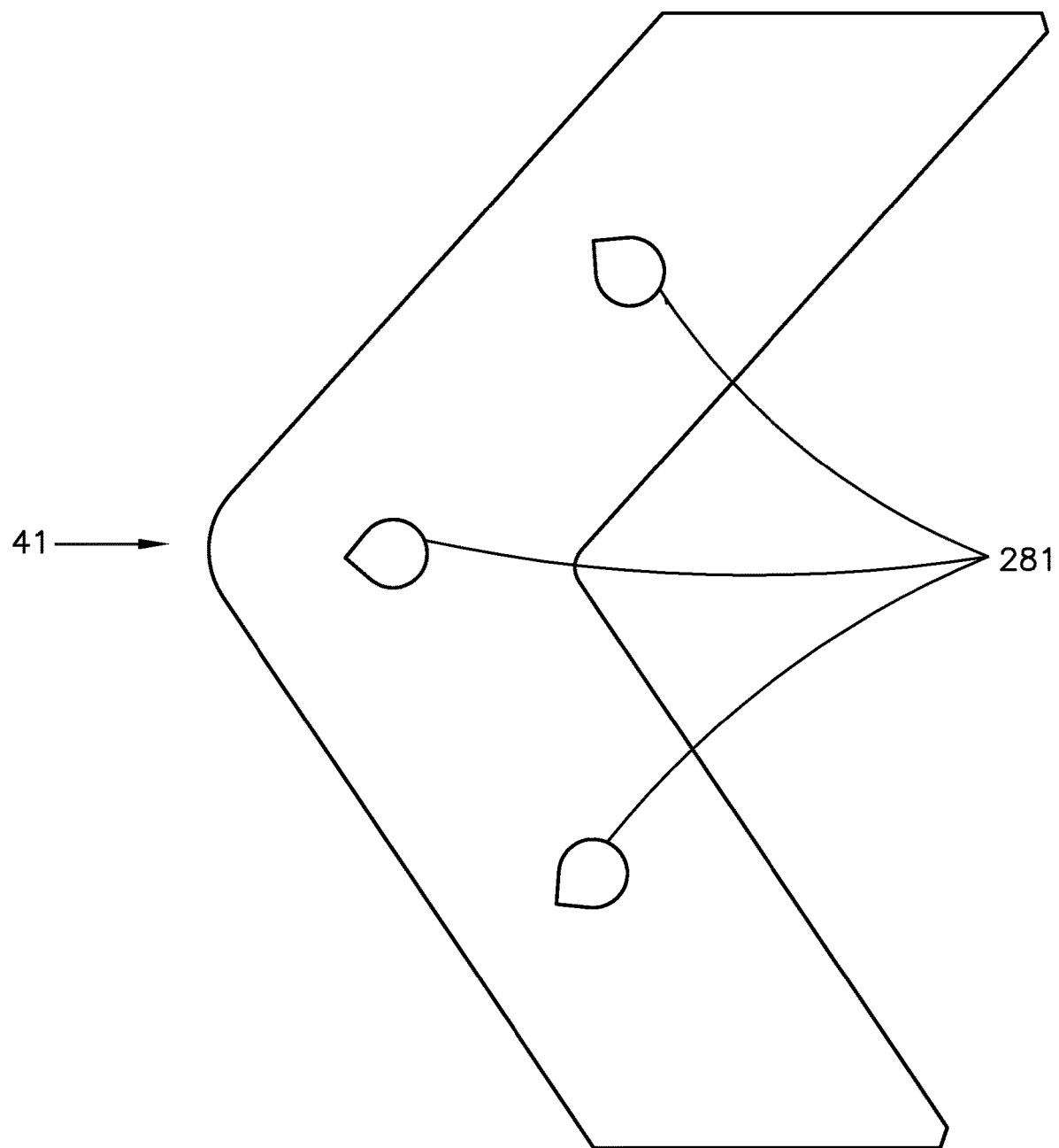
FIG. 25 is an end view of one preferred embodiment of a corner plate.

FIG. 25 provides a view of the preferred embodiment corner plate 41 with holes 281 that will accommodate screws 35 or drill screws or bits as a drill guide.

FIG. 26 shows a duct flange assembly with inserted corner plates clamping an alternative cable type bracket.

FIG. 26A is an end view of a serrated washer surface of a screw of the alternative cable type bracket and illustrating a manner of wrapping the cable about the screw.

FIG. 27 is an end view of a duct section assembly and alternative cable hangers.

FIG. 28 is an end view of a duct section assembly and an alternative cable hanging arrangement.

Figure 29:
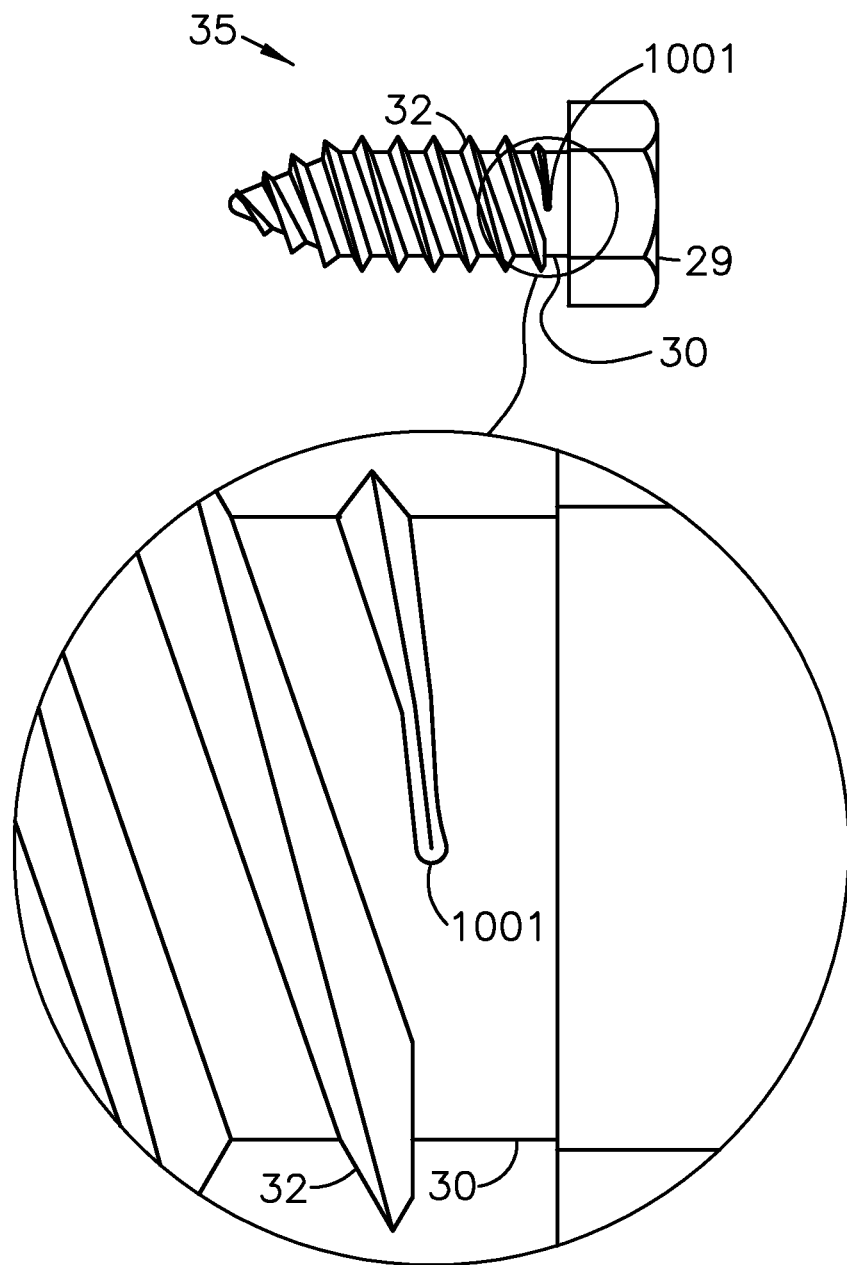
FIG. 29 is a side view of an embodiment of a screw of the invention, showing an endmost thread of the screw.

FIG. 29 is a side view of an embodiment of a screw 35 of the invention, showing an alternative configuration of an endmost thread 1001 of a threaded portion 32 adjacent unthreaded space 30 of the screw.

Figure 30:
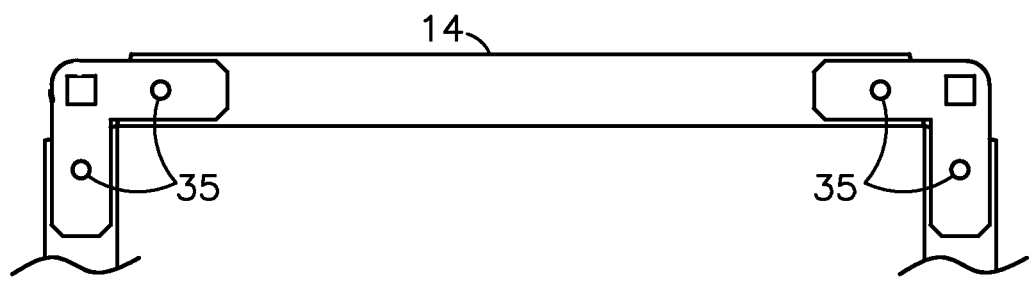
FIG. 30 is a fragmentary end view of a duct section assembly including inserted corner plates incorporating elements for connection to hanger brackets.

FIG. 30 is a fragmentary end view of a duct section assembly including inserted corner plates incorporating elements for connection to hanger brackets.

Figure 31:
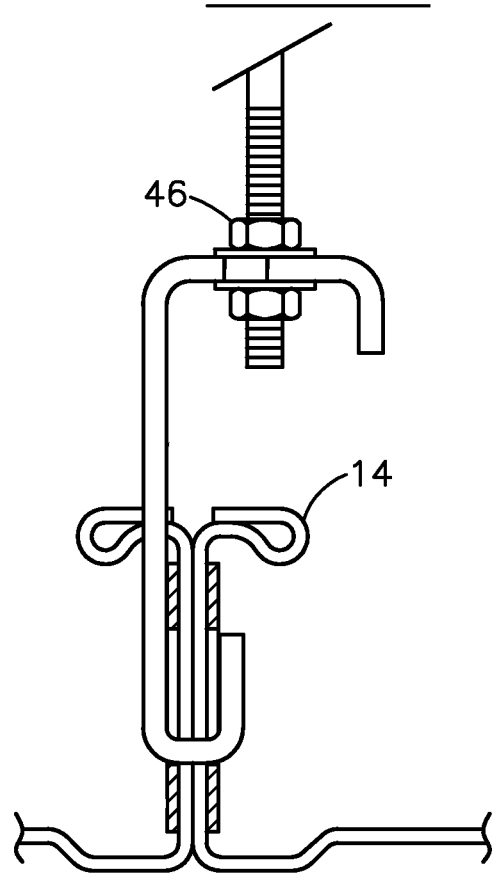
FIG. 31 is a sectional view of the duct section assembly of FIG. 30 including inserted corner plates incorporating elements for connection to hanger brackets, and showing a hanger bracket in connection therewith.

FIG. 31 is a sectional view of the duct section assembly of FIG. 30 including inserted corner plates incorporating elements for connection to hanger brackets, and showing a hanger bracket in connection therewith.

Figure 32:
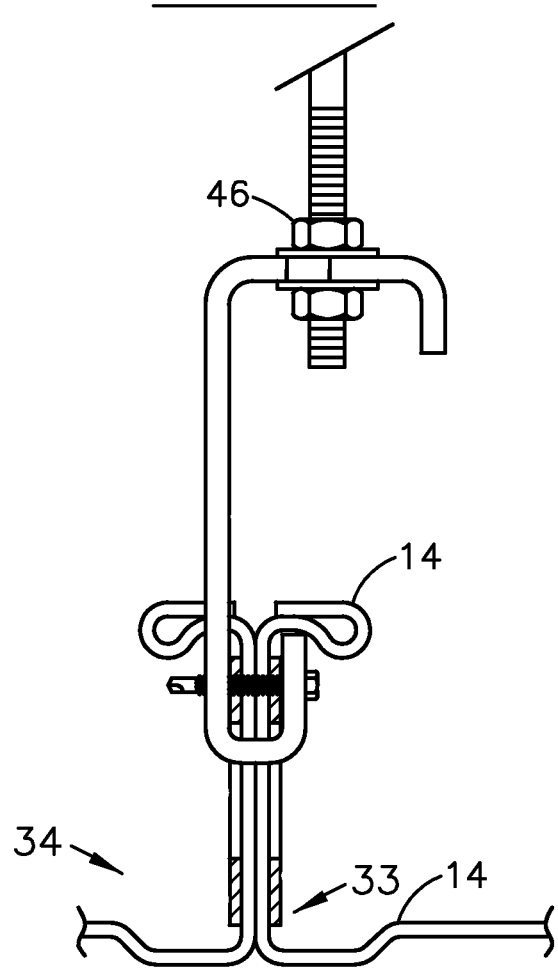
FIG. 32 is a sectional view of the duct section assembly of FIG. 30 including inserted corner plates incorporating elements for connection to hanger brackets, and showing an alternative hanger bracket in connection therewith.

FIG. 32 is a sectional view of the duct section assembly of FIG. 30 including inserted corner plates incorporating elements for connection to a hanger bracket, and showing an alternative hanger bracket in connection therewith.

Figure 33:
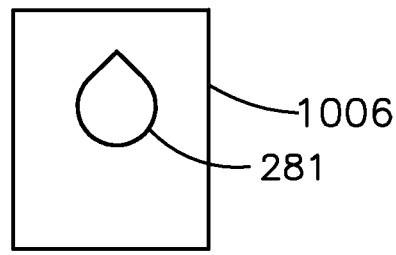
FIG. 33 is a top view of a sheet metal nut having a representative teardrop shape hole therein, for use the invention.

FIG. 33 shows a sheet metal nut 1006 of the invention, having a teardrop shape hole 281 therethrough. Nut 1006 can be placed against a second one of the inserted corner plates 28 of an assembly such as those discussed above, with hole 281 aligned with the aligned holes 351 through that and the first corner plate 28, such that the screw 35 can be threadedly engaged with hole 281 to retain or support the second corner plate 28. Nut 1006 is advantageous to back up and provide additional holding strength for the fastened connection, and also to replace direct threaded engagement with the second corner plate 28 in the event hole 351 thereof is stripped, damaged, or otherwise not usable or adequate for holding the corner plates together.

In light of all the foregoing, it should thus be apparent to those skilled in the art that there has been shown and described a SYSTEM AND METHOD FOR JOINING AND HANGING DUCTS. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A duct assembly for transporting pressurized fluid therethrough comprising:

at least first and second duct sections, each of said duct sections having sides extending between opposite end portions, each of said sides joining an adjacent side and having a duct channel flange extending laterally outward from each end portion, each of said duct channel flanges having opposite side portions, said at least first and second duct sections being positioned in end-to-end relationship so that said duct channel flanges extending outward from one of said end portions of the first duct section face the duct channel flanges extending outward from one of the end portions of said second duct section thereby defining aligned duct channel flange pairs;

a plurality of corner flange connection member pairs, each of said connection member pairs being positioned at an end of said at least first and second duct sections, each of said corner flange connection members including two leg portions joined together in angular relationship by a corner portion, each said corner flange connection member being substantially flat and including at least one opening extending through said corner portion for receiving a fastening member therethrough;

wherein each of said connection member pairs includes a first corner flange connector member spanning adjacent duct channel flanges of said first duct section and a second corner flange connection member spanning adjacent duct channel flanges of said second duct section, said first and second corner flange connection members being positioned on opposite faces of an adjacent duct channel flange pair so that said flange pair is positioned between said first and second corner flange connection members and such that the opening associated with one of said corner flange connection members is positioned in substantial alignment with the opening associated with the opposed corner flange connection member forming a pair of openings;

at least one fastening member extending through each of said connection member pairs for connecting said duct channel flange pairs, said at least one fastening member being first positioned through the opening associated with one of said opposed connection members, and through the substantially aligned opening associated with the other of said opposed connection members;

wherein said fastening member includes a head and a shaft portion having threads;

wherein said threads extend from a location on said shaft that is spaced apart from an underside of said head by a distance substantially equal to a thickness of at least one of said corner flange connection members, to a tapered tip of said shaft defining a point;

wherein said threads include a first distal portion adjacent said point, said first distal portion being oriented at a substantially non-orthogonal angle with respect to a longitudinal axis of said shaft, and a second distal portion adjacent said head, said second distal portion being oriented at a substantially orthogonal angle with respect to said longitudinal axis of said shaft;

wherein no surface of said first distal portion defines a plane that is substantially orthogonal with respect to said longitudinal axis of said shaft; and a second thread adjacent said second distal portion, wherein at least a portion of said second thread is formed to be substantially orthogonal with respect to said longitudinal axis of said shaft.

2. The duct assembly of claim 1, wherein:

the opening in at least one of the first corner flange connector member and the second corner flange connector member has one of a teardrop shape, a diamond shape with contoured corners at two opposing corners of the opening, an eye shape, a rectangular shape, or a half-diamond shape on one end and a curved shape on an opposite end.

3. The duct assembly of claim 1, wherein:

the opening in at least one of the first corner flange connector member and the second corner flange connector member has a teardrop shape.

4. The duct assembly of claim 3, wherein:

the openings in both the first corner flange connector member and the second corner flange connector member have a teardrop shape.

5. The duct assembly of claim 1, wherein:

the opening in at least one of the first corner flange connector member and the second corner flange connector member has an eye shape.

6. The duct assembly of claim 1, wherein:

the opening in at least one of the first corner flange connector member and the second corner flange connector member has a rectangular shape.

7. The duct assembly of claim 1, wherein:

the opening in at least one of the first corner flange connector member and the second corner flange connector member has a half-diamond shape on one end and a curved shape on an opposite end.

8. The duct assembly of claim 1, wherein the fastening member and the opening through at least one of the first corner flange connector member and the second corner flange connector member are configured to threadedly engage in a manner wherein the fastening member is tilted at a small acute angle relative to a substantially perpendicular orientation, and such that the fastening member will automatically transition to the substantially perpendicular orientation when fully received through the opening.

9. A connection system for a duct assembly having first and second duct sections, each of said duct sections having a duct channel flange extending laterally outward therefrom and being positioned in end-to-end relationship with one another, said connection system comprising:

a pair of corner connection members positioned in communication with said duct channel flanges of said first and second duct sections, each of said pair of corner connection members including two leg portions joined together in angular relationship by a corner portion and including at least one opening for receiving a threaded fastening member therethrough;

wherein said openings in each of said pair of corner connection members are substantially aligned with one another when said pair of corner connection members are positioned in communication with said duct channel flanges of said first and second duct sections and said duct sections are positioned in end-to-end relationship with one another;

wherein said threaded fastening member includes a continuous thread formed along a shaft, said continuous thread being oriented at an acute angle to a longitudinal axis of said shaft and extending from a tapered distal end tip of said shaft, thereby defining a point, to a starting location spaced apart from a head of said threaded fastening member;

wherein said thread defines a substantially non-orthogonal portion adjacent said point, as well as a substantially orthogonal portion adjacent said starting location;

wherein said starting location is spaced apart from said head by a distance substantially equal to a thickness of at least one of said corner connection members;

wherein no surface of said non-orthogonal portion adjacent said point defines a plane that is substantially orthogonal with respect to said longitudinal axis of said shaft; and wherein said continuous thread includes a second thread directly adjacent to said starting location, wherein at least a portion of said second thread is formed to be substantially orthogonal with respect to said longitudinal axis of said shaft.

10. The connection system for a duct assembly having first and second duct sections, each of said duct sections having a duct channel flange extending laterally outward therefrom and being positioned in end-to-end relationship with one another, according to claim 9, wherein:

said threads are configured to pass through at least one of said openings in said pair of corner connection members without deforming a periphery of at least one of said openings.

11. An assembly kit for assembling adjacent first and second duct sections, each of said duct sections having a duct channel flange extending laterally outward therefrom, said assembly kit comprising:

a first corner member having a first opening, said first corner member being dimensioned to fit within said duct channel flange;

a second corner member having a second opening, said second corner member being dimensioned to fit within said duct channel flange;

a fastener dimensioned to engage said first opening and said second opening, said fastener including a continuous thread formed along a shaft;

wherein said continuous thread extends along a longitudinal axis from a tapered distal end tip of said shaft defining a point, to a location spaced apart from a head of said fastener by a distance substantially equal to a thickness of at least one of said first corner member and said second corner member;

wherein said continuous thread does not evidence a surface substantially orthogonal to said longitudinal axis adjacent said point of said shaft;

wherein said continuous thread does evidence a surface substantially orthogonal to said longitudinal axis adjacent said head; and wherein said continuous thread includes a second thread adjacent said substantially orthogonal surface adjacent said head, wherein at least a portion of said second thread is formed to be substantially orthogonal with respect to said longitudinal axis of said shaft.

12. A fastening member utilized in assembling adjacent first and second duct sections, each of said duct sections having a duct channel flange extending laterally outward therefrom, said fastening member comprising:

a head;

a shaft integrally fixed to said head and extending to a tapered distal end tip, ending in a point;

a continuous thread formed along said shaft;

wherein said continuous thread includes a first distal portion extending to said point, said first distal portion being oriented at a substantially non-orthogonal angle with respect to a longitudinal axis of said shaft, and a second distal portion spaced from said head, said second distal portion being oriented at a substantially orthogonal angle with respect to said longitudinal axis of said shaft;

wherein no surface of said first distal portion defines a plane that is substantially orthogonal with respect to said longitudinal axis of said shaft; and a second thread adjacent said second distal portion, wherein at least a portion of said second thread is formed to be substantially co-planar with said second distal portion.

* * * * *